US012756317B2

(12) United States Patent
Nene et al.

(10) Patent No.: US 12,756,317 B2
(45) Date of Patent: Oct. 6, 2026

(54) HANDLING OF ERRORS IN GENERATION OF PHASE CONTROL SIGNALS BY A PHASE CONTROLLER OF A MULTI- PHASE SWITCHING CONVERTER

(71) Applicant: Shaoxing Yuanfang Semiconductor Co., Ltd., Shaoxing (CN)

(72) Inventors: Santosh Nene, Bangalore (IN); Anil Narayan Kakade, Bangalore (IN); Suresh Venkatesan, Bangalore (IN); Ramkishore Ganti, Bangalore (IN); Shyam Somayajula, Bangalore (IN); Junqing Teng, Shanghai (CN)

(73) Assignee: Ningbo Aura Semiconductor Co., Ltd, Ningbo (CN)

( * ) Notice: Subject to any disclaimer, the term of this patent is extended or adjusted under 35 U.S.C. 154(b) by 136 days.

(21) Appl. No.: 18/944,011

(22) Filed: Nov. 12, 2024

(65) Prior Publication Data

US 2025/0260326 A1 Aug. 14, 2025

(30) Foreign Application Priority Data

Feb. 8, 2024 (IN) ............................ 202441008611

(51) Int. Cl.
*H02M 3/158* (2006.01)
*H02M 1/00* (2006.01)
*H02M 3/156* (2006.01)

(52) U.S. Cl.
CPC ....... *H02M 3/1586* (2021.05); *H02M 1/0003* (2021.05); *H02M 3/1566* (2021.05)

(58) Field of Classification Search
CPC ............. H02M 3/1584; H02M 3/1586; H02M 1/0003; H02M 3/1566
See application file for complete search history.

(56) References Cited

U.S. PATENT DOCUMENTS 8,710,810 B1 4/2014 McJimsey et al.
2008/0197824 A1* 8/2008 Qiu .................... H02M 3/1584 323/272

(Continued)

FOREIGN PATENT DOCUMENTS

CN 111742478 A 10/2020
CN 112737334 B 6/2022

(Continued)

OTHER PUBLICATIONS

Yi Xiong, Constant On-time Controlled Four-phase Buck Converter via Saw-toothwave Circuit and its Element Sensitivity, https://kobaweb.ei.st.gunma-u.ac.jp/news/pdf/2017/2017-11-29kuma-paper.pdf, Nov. 29, 2017, 06 Pages, Proceedings of International Conference on Mechanical, Electrical and Medical Intelligent System.

(Continued)

*Primary Examiner* — Fred E Finch, III
(74) *Attorney, Agent, or Firm* — IPHORIZONS PLLC; Narendra Reddy Thappeta

(57) ABSTRACT

A phase distributor in a phase controller of a multi-phase switching converter detects and corrects errors in the generation of phase control signals used for activating multiple phases. The phase distributor receives a common control signal having a transition type indicating time instances at which generated timing signals are to be asserted, with the assertions timing the state change of corresponding phase control signals. A first error condition is when multiple of the timing signals are asserted in a cycle of the common control signal. A first corrective action entails avoiding the first error condition in a first future duration following the error detection. A second error condition is when none of the timing signals is asserted when the transition type occurs on the common control signal. A second corrective action (Continued)

entails avoiding the second error condition in a second future duration following the error detection.

20 Claims, 12 Drawing Sheets

(56) References Cited

U.S. PATENT DOCUMENTS

| | | | | |
|---|---|---|---|---|
| 2011/0012574 | A1* | 1/2011 | Lish | H02M 3/1584 323/282 |
| 2016/0315538 | A1 | 10/2016 | Nguyen et al. | |
| 2018/0191333 | A1* | 7/2018 | Chen | H03K 7/08 |
| 2019/0074770 | A1 | 3/2019 | Trichy et al. | |
| 2020/0186137 | A1 | 6/2020 | Jiang | |
| 2023/0079601 | A1 | 3/2023 | Bafna et al. | |
| 2023/0130783 | A1* | 4/2023 | Bafna | H02M 1/15 323/272 |
| 2023/0238875 | A1 | 7/2023 | Yang et al. | |
| 2024/0333161 | A1* | 10/2024 | Hsiao | H02M 3/1586 |

FOREIGN PATENT DOCUMENTS

| | | | |
|---|---|---|---|
| CN | 116526838 | A | 8/2023 |
| WO | 2019160636 | A1 | 8/2019 |

OTHER PUBLICATIONS

Wei, Hu, Stabilization of Constant-on Time Controlled Buck Converter, 2015, 04 Pages, International Conference on Mechatronics, Electronic, Industrial and Control Engineering.

Wen-Chin Liu, A Novel Ultrafast Transient Constant ON-Time Buck Converter for Multiphase Operation, Nov. 2021, 11 Pages, vol. 36—Issue No. 02, IEEE Transactions on Power Electronics.

Multi-Phase PWM Controller, Dec. 29, 2004, 21 Pages, Intersil Corporation.

* cited by examiner

HANDLING OF ERRORS IN GENERATION OF PHASE CONTROL SIGNALS BY A PHASE CONTROLLER OF A MULTI- PHASE SWITCHING CONVERTER

PRIORITY CLAIM

The instant patent application is related to and claims priority from the co-pending India provisional patent application entitled, "Self-Correcting Phase Distributor for Multi-Phase Controllers", Serial No.: 202441008611, Filed: 8 Feb. 2024, which is incorporated in its entirety herewith to the extent not inconsistent with the description herein.

BACKGROUND

Technical Field

Embodiments of the present disclosure relate generally to multi-phase switching converters, and more specifically to handling of errors in generation of phase control signals by a phase controller of a multi-phase switching converter.

Related Art

Switching converters refer to components which convert an input AC (alternating current) or DC (direct current) voltage of one magnitude to an output DC voltage of a desired magnitude by employing and operating switch(es), as is well known in the relevant arts. Switching converters find use as stand-alone power supplies, in voltage regulator modules used in several environments such as laptops, mobile phones, etc.

A switching converter often employs multiple power stages, which together generate the regulated DC voltage. Each power stage generates a corresponding part of the requisite load current in a respective phase of a sequence of phases, and thus such a switching converter is referred to as a multi-phase switching converter.

The power stages are controlled by a phase controller using respective phase control signals. One state of the phase control signal (e.g., logic high) in a phase duration causes the corresponding power stage to generate the corresponding part of the load current for that phase duration. The phase control signals are timed according to respective timing signals generated internal to the phase controller.

There are often scenarios when the generated phase control signals deviate from the ideal scenario, which could lead to undesirable consequences such as excessive ripple in the output current, lower efficiency, inability to provide requisite load current, etc. Aspects of the present disclosure are directed to handling of any such errors in the generation of phase control signals by the phase controller.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Aspects of the present disclosure are directed to a multi-phase switching converter that provides a regulated supply voltage from an input voltage. The multi-phase switching converter contains multiple power stages, with each power stage receiving a respective phase control signal. A phase controller of the multi-phase switching converter contains signal generators and a phase distributor, with each signal generator generating a corresponding phase control signal which changes to a first state (e.g., logic high) timed according to an assertion of a respective timing signal. The phase distributor receives a common control signal having a transition type (e.g., low-to-high) to indicate time instances at which the respective timing signals are to be asserted.

According to an aspect of the present disclosure, the phase distributor detects a first error condition as being when more than one of the timing signals is asserted at a first time instance in a cycle of the common control signal, and performs a first corrective action to avoid the first error condition in a first future duration following the first time instance.

According to another aspect of the present disclosure, the phase distributor detects a second error condition as being when none of the timing signals is asserted at a second time instance in response to the transition type occurring on the common control signal, and performs a second corrective action to avoid the second error condition in a second future duration following the second time instance.

In an embodiment, the phase distributor contains multiple ring cells, with each ring cell corresponding to a respective power stage, and multiple correction cells, with each correction cell corresponding to a respective ring cell. The ring cells are connected in a circular sequence such that an input-flop signal of each ring cell corresponds to an output-flop signal of the previous ring cell, with a first ring cell receiving the output-flop signal of the last ring cell. Each ring cell contains a flip-flop clocked by the common control signal.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
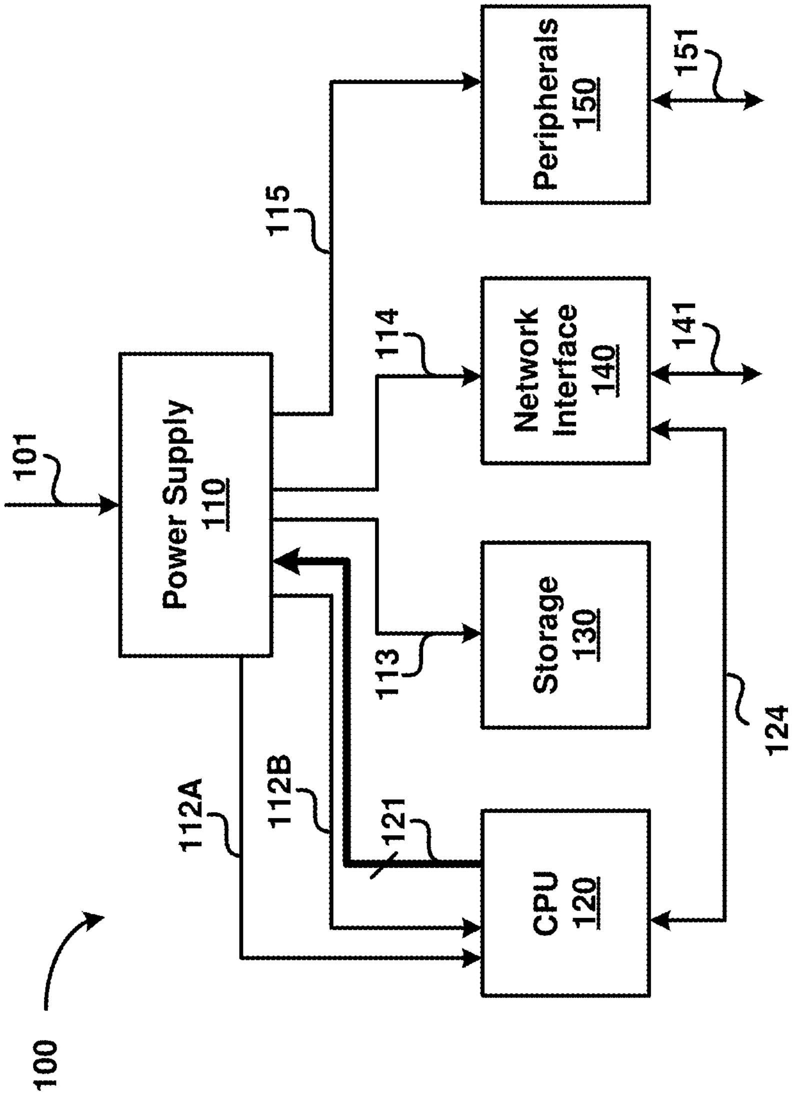
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provide two-way communication between system 100 and a computer network, or in general Internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 on path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to reduce/increase voltage output based on the specific signal (e.g., PS1, PS2 and PS3).

In an embodiment, power supply 110 is a voltage regulator module (VRM), sometimes also called processor power module (PPM), and contains one or more voltage regulators. The voltage regulators include step-down switching (buck) converters to generate several smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM implemented as a multi-phase switching converter as shown in FIG. 2.

3. Multi-Phase Switching Converter

Figure 2:
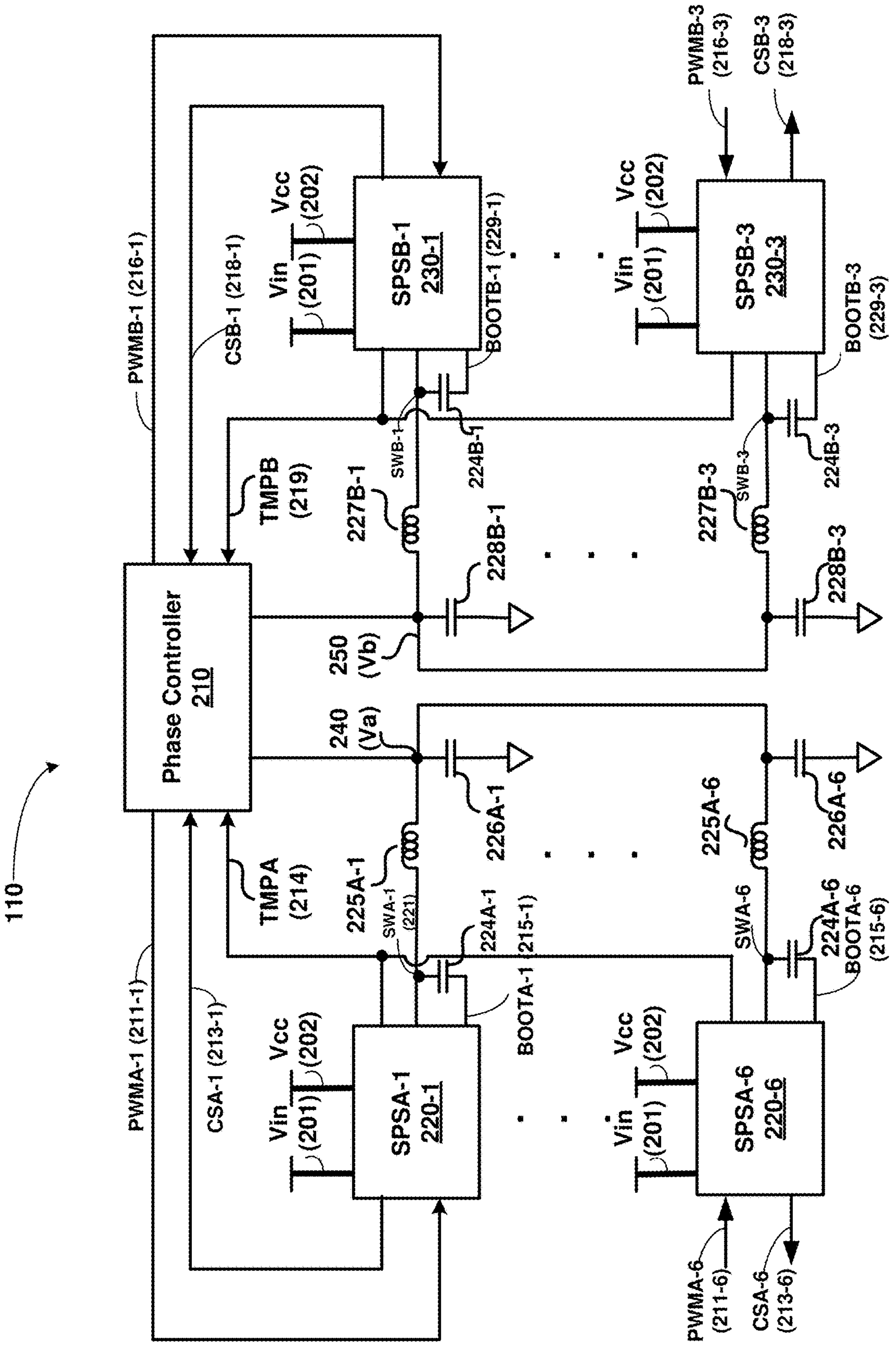
FIG. 2 is a block diagram illustrating the details of a multi-phase switching converter in an embodiment of the present disclosure.

FIG. 2 is a block diagram illustrating the details of power supply 110 (of FIG. 1) in an embodiment of the present disclosure. Power supply 110 is shown implemented as a multi-phase switching converter that generates two regulated power supplies (supply rails) Va (240) and Vb (250), and is shown containing phase controller 210, smart power stages (power stages) (SPS) SPSA-1 (220-1) through SPSA-6 (220-6), SPSB-1 (230-1) through SPSB-3 (230-3), inductors 225A-1 through 225A-6, 227B-1 through 227B-3, output capacitors 226A-1 through 226A-6, 228B-1 through 228B-3, and bootstrap capacitors 224A-1 through 224A-6, 224B-1 through 224B-3.

In the example, power supply Va (240) is generated by a 6-phase buck converter (there are six SPSs—220-1 through 220-6), while power supply Vb (250) is generated by a 3-phase buck converter (there are three SPSs—230-1 through 230-3). Nodes/Paths 240 and 250 correspond to paths 112A and 112B respectively of FIG. 1. In the interest of conciseness, other power supply circuits that generate supplies on paths 113, 114 and 115 are not shown in FIG. 2.

Power stages 220-1 through 220-6, and 230-1 through 230-3, may be generically referred below by respective numerals 220 and 230, as will be clear from the context. Also, signals/nodes 211-1 through 211-6, 213-1 through 213-6, 215-1 through 215-6, 216-1 through 216-3, 218-1 through 218-3, 229-1 through 219-3 may be generically referred by respective numerals 211, 213, 215, 216, 218 and 229, as will also be clear from the context. Similar convention is followed for other blocks/components/signals throughout the disclosure.

Each bootstrap capacitor associated with an SPS is shown connected between respective nodes SW and BOOT of the corresponding SPS. Thus, bootstrap capacitor 224A-1 is shown connected between switching node SWA-1 (221) and BOOTA-1 (215-1). Although bootstrap capacitor is shown connected external to each SPS, in alternative embodiments, bootstrap capacitor may be internal to the SPS.

The combination of (corresponding circuitry within) phase controller 210, a power stage, an inductor and a capacitor forms one "phase" of a multi-phase switching converter. Thus, for example, SPSA-1, inductor 225A-1, capacitor 226A-1, and the corresponding portion within phase controller 210 represent one phase of the 6-phase buck converter.

Each power stage may be implemented to contain a high-side switch, a low-side switch, gate-drive circuitry for the two switches, and other circuits. Examples of other circuits include, but are not limited to, temperature monitor circuit, inductor-current sense (or emulation) circuit, etc., to provide information, such as temperature of the SPS/power stage, magnitude of inductor current, etc., to phase controller 210. Each SPS receives a source of power as an input which is connected to the high-side switch. In FIG. 2, the supply source is numbered 201, and has a voltage Vin. In an embodiment, the value of Vin is 21 volts (V), and Va and Vb are respectively 3.3V and 1.8V. Each SPS is also shown receiving a voltage Vcc on path 202. In an embodiment, Vcc has a voltage of 3.3 V, and is provided by phase controller 210.

Each SPS communicates with phase controller 210 via corresponding signals PWM, CS and TMP. Thus, SPSA-1 is shown connected to phase controller 210 through signal/paths PWMA-1 (211), CSA-1 (213) and TMPA (214). SPSA-6 communicates with phase controller 210 via signals PWMA-6, CSA-6 and TMP (214). Similarly, SPSB-1 is shown connected to phase controller 210 through signal/paths PWMB-1 (216), CSB-1 (218) and TMPB (219). SPSB-3 communicates with phase controller 210 via signals PWMB-3, CSB-3 and TMP (219). The other SPSs would have similar connections with phase controller 210.

Signal TMP is an output from an SPS to phase controller 210, and provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210.

Signal CS (current-sense) is an input to phase controller 210 from an SPS, and contains information representing the magnitude of the inductor-current of that phase. The information can be in the form of a current, voltage, digital values, etc.

Signal PWM is an input to an SPS from phase controller 210, and may be viewed as a 'phase control signal' that controls the operation (ON and OFF states) of the power switches in the SPS of the corresponding phase. In an embodiment of the present disclosure, phase controller 210 employs a constant-ON-time control technique to generate Va and Vb. Accordingly, in such an embodiment, signal PWM is a variable frequency, fixed pulse-width (constant-ON-time) signal (i.e., pulse-frequency modulated signal, although the acronym PWM is still used herein to refer to such a signal for case of reference). The frequency of the signal is generally proportional to the desired regulated voltage (Va or Vb), the input voltage and the load current. However, in general, signal PWM can be of other types depending on the specific implementation details of power supply 110.

When logic LOW is detected by the SPS on signal PWM, the low-side switch is turned ON, and when logic HIGH is detected on signal PWM, the high-side switch is turned ON. Upon detecting a high-impedance (hi-Z) state (typically mid-rail voltage between power supply and ground) on signal PWM the SPS turns OFF both its high-side and the low-side switches. Thus, an SPS is said to be 'enabled' when the corresponding PWM signal is toggling between the HIGH and LOW states, and is said to be 'disabled' when the corresponding PWM signal is in hi-Z state. In other words, the SPS is not operational to generate a voltage or supply current when it detects a hi-Z value on PWM signal for a time period greater than a predetermined threshold. An SPS is said to be 'activated'/active when the corresponding PWM signal is in logic HIGH state, and the SPS is driving current into its inductor from Vin.

The power stages of a rail are operated to supply current in an interleaved and sequential manner. In other words, the PWM signals to each SPS of multi-phase switching converter 110 are staggered/interleaved, i.e., delayed with respect to each other in phase, in which the ON-durations of the SPSs may overlap, depending at least on the load requirement. However, under normal conditions (without any errors), no two PWM signals are activated (transitioned to, say, logic HIGH) simultaneously (at or substantially at the same time instant) since such simultaneous transitions may lead to undesirable effects, such as for example, large ripple in the output regulated voltage.

Phase controller 210 controls the operation of the power stages via the signals noted above to provide various functions including regulating functions to enable the generation of regulated voltages Va and Vb by the corresponding sets of power stages. Accordingly, Va and Vb are shown as being provided as inputs to phase controller 210 to enable operation of one or more feedback loops within phase controller 210 to regulate Va and Vb. Phase controller 210 also receives inductor-current information (current flowing through each of the inductors) from each of the SPSs to enable various operations such as current-mode control of voltage regulation, current limiting, short circuit protection, and balancing the currents generated by each SPS of a same rail (e.g., rail Va) so as to make the currents from each SPS substantially equal in magnitude. Phase controller 210 may additionally perform various other operations which are not noted here in the interest of conciseness.

Phase controller 210 also operates to control the power stages to reduce/increase current output based on the load demand. Further, phase controller 210 may also receive signals from CPU 120 that indicate a desired power state (e.g., PS1, PS2, etc. noted above) in which the CPU operates from time to time. In response, phase controller 210 may disable/enable one or more of power stages 220 depending on the power state and the load currents.

Phase controller 210 implemented according to aspects of the present disclosure handles errors in generation of PWM signals, as described below with examples.

4. Flow-chart

Figure 3:
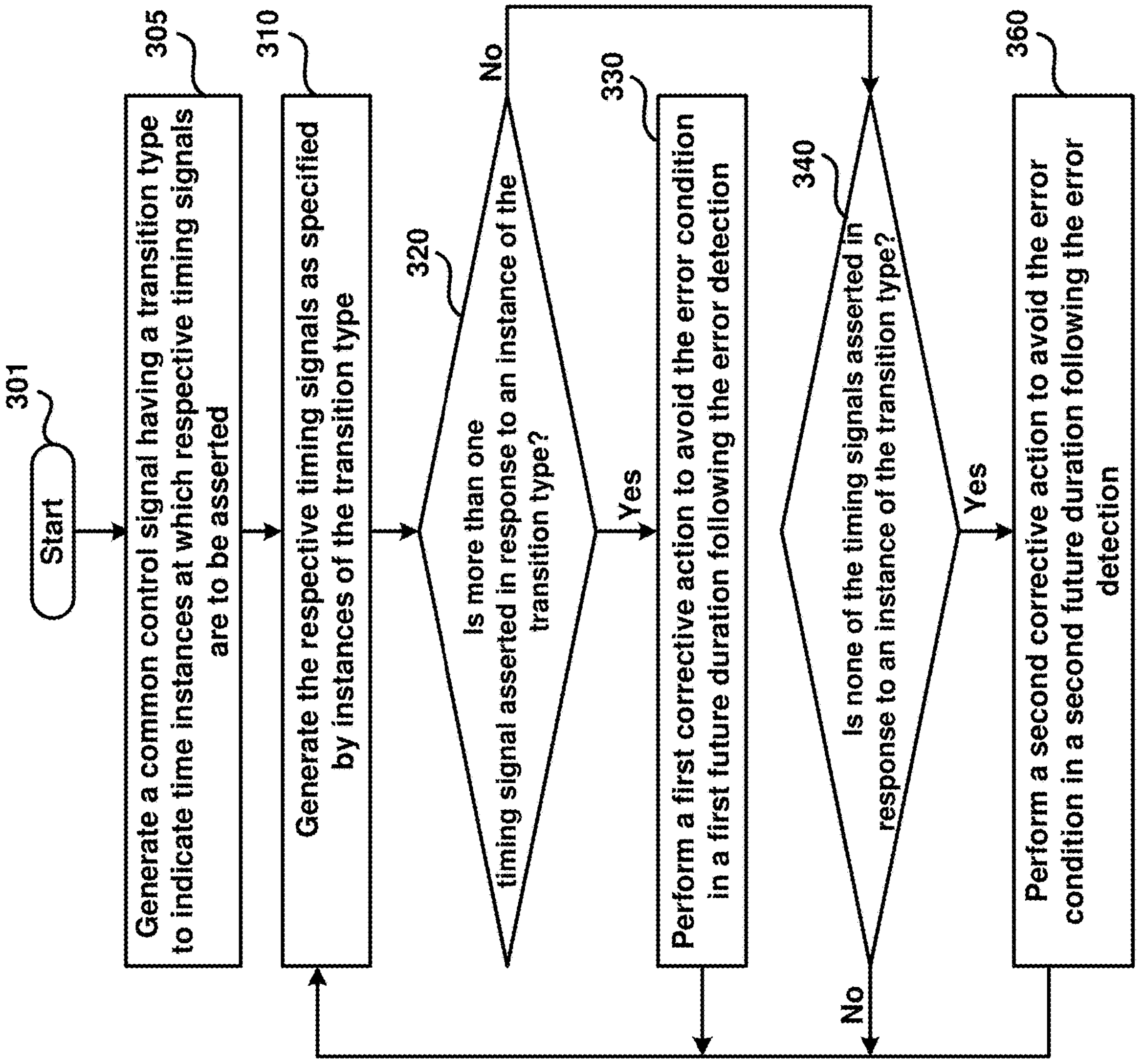
FIG. 3 is a flow-chart illustrating the manner in which a phase controller operates to handle errors in generation of phase control signals, according to an aspect of the present disclosure.

FIG. 3 is a flowchart illustrating the manner in which a phase controller of a multi-phase switching converter handles errors in generation of PWM signals, according to an aspect of the present disclosure. The flow-chart is described with respect to the system/multi-phase switching converter of FIGS. 1 and 2 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some or all of the steps may be performed in a different sequence than that depicted below, as suited to the specific environment, as will be apparent to one skilled in the relevant arts. Many of such implementations are contemplated to be covered by several aspects of the present disclosure. The flow-chart begins in step 301, in which control immediately passes to step 310.

In step 305, phase controller 210 generates a common control signal having a transition type (e.g., logic-low to logic-high) to indicate time instances of assertions of timing signals. The common control signal is generated internal to phase controller 210.

In step 310, phase controller 210 generates phase control signals (PWM signals) to power stages (e.g., SPSA 220) as specified by instances of the transition type of the common control signal. Specifically, a PWM signal changes to a first state (e.g., logic HIGH) timed according to an assertion of the respective timing signal. The time instances of assertions of the timing signals are in turn indicated by corresponding transitions (e.g., logic-low to logic-high) of the common control signal, as noted above.

Under normal (error-free) operation, only one timing signal is asserted at an instance (or in response to an instance) of the transition type of the common control signal. Such a technique is employed for reasons such as, for example, to increase efficiency of the switching converter, to reduce ripple in the output regulated voltage, etc. In other words, under normal operation, timing signals generated internal to phase controller 210 are always sequential and staggered. Control passes to step 320.

In step 320, phase controller 210 checks if more than one of the timing signals is asserted at an instance of the transition type of the common control signal. Assertion of more than one timing signal may lead to undesirable effects such as reduction in efficiency, large ripple in the output regulated voltage, etc. If the error condition is determined to exist, control passes to step 330, and to step 340 otherwise.

In step 330, phase controller 210 performs a corrective action to avoid the error condition in a future duration following the detection of error condition noted in step 320. Such corrective action may entail asserting only a single timing signal in a future duration (e.g., in a next or later cycle of the common control signal) following the error detection. Control passes to step 310.

In step 340, phase controller checks if none of the timing signals is asserted (e.g., to logic HIGH) at an instance of the transition type of the common control signal. When none of the timing signals is asserted, none of the SPSs operate, and accordingly the regulated voltage may start dropping in magnitude and/or load current requirement may not be met. If such an error condition is determined to exist, control passes to step 360, and to step 310 otherwise.

In step 360, phase controller 210 performs a corrective action to avoid the error condition in a future duration following the detection of error condition noted in step 340. Such corrective action may entail asserting only a single timing signal in a future duration (e.g., in a next or later cycle of the common control signal) following the error detection. Control passes to step 310.

Thus, phase controller of the present disclosure provides error handling in generation of timing signals (and thereby, phase control signals) in a multi-phase switching converter.

The implementation details of a phase controller that handles errors in generation of phase control signals in an embodiment of the present disclosure are provided next.

5. Phase Controller

Figure 4A:
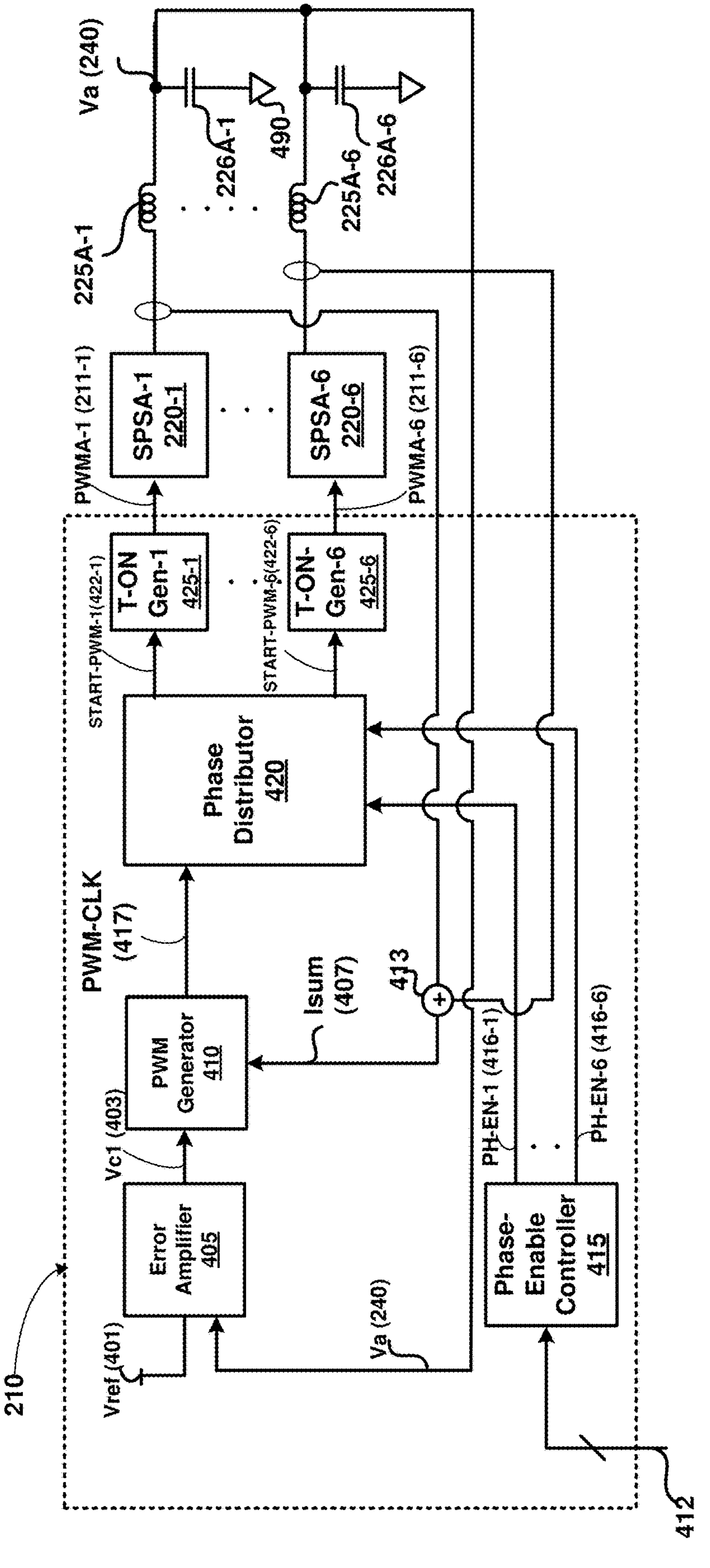
FIG. 4A is a block diagram illustrating the implementation of a phase controller in an embodiment of the present disclosure.

FIG. 4A is a block diagram illustrating the implementation details of a phase controller in an embodiment of the present disclosure. Phase controller 210 is shown as containing error amplifier 405, PWM generator 410, phase distributor 420, ON-time generators (T-ON Gen 425-1 through T-ON-Gen 425-6), phase-enable controller 415 and adder 413. Also shown in the Figure for the purpose of case of understanding and clarity are the power stages 220-1 through 220-6, and the corresponding inductors and capacitors. Only the 6-phase converter containing power stages SPSA-1 (220-1) through SPSA-6 (220-6) together generating voltage Va (240) is depicted in FIG. 4A for ease of understanding. Also, it is noted herein that only components as relevant to the understanding of the disclosure are depicted in FIG. 4A. It is understood that phase controller 210 can contain more or fewer blocks than those shown in FIG. 4A. Further, phase controller 210 is described and illustrated as employing constant ON-time control technique merely for illustration. However, it must be understood that phase controller 210 can employ other types of control techniques. The internal blocks of phase controller 210 may be powered by a source, not shown.

Vref represents the desired target voltage to be supplied at node Va (240). Thus, Vref represents a stable reference DC voltage which is generated internally in phase controller 210 in a known way. Error amplifier 405 receives reference voltage Vref (401) (or alternatively, some fraction of Va using a voltage divider network), output voltage, Va (240) and generates voltage Vc1 (403) representing the difference between voltages Vref (401) and Va (240), that forms one input to PWM generator 410. Adder 413 adds the sensed inductor-currents flowing through the respective inductors to generate a summation signal Isum (407), that forms another input to PWM generator 410. PWM generator 410 generates signal PWM-CLK (417) based on signals Vc1 and Isum. PWM-CLK (417) may be a sequence of pulses (for example, of fixed pulse-width), and whose frequency may be variable based on changes in Vin, Vout and load current.

Signal PWM-CLK (417) is typically a short pulse of a fixed duration and clocks components (such as flip-flops) inside phase distributor 420. Blocks 405, 410 and 413 may together be viewed as a 'control block' designed to generate 'common control signal' PWM-CLK (417) such that voltage Va (240) is maintained at the desired constant magnitude as indicated by Vref (401).

PWM generator 410 may internally contain components (not shown in FIG. 4A) such as sawtooth waveform generator, comparators, etc. required to generate signal PWM-CLK (417), as is also well known in the relevant arts. PWM generator 410 may be implemented in a known way.

Phase-enable controller 415 receives input(s) on path 412 representing the load current requirement, sensed inductor-currents of each power stage, overshoot/undershoot of voltage Va (240), etc., and generates phase-enable signals on paths 416-1 through 416-6. Phase-enable controller 415 controls the addition or shedding of phases (and therefore power stages) based on load current requirements. In an embodiment, a logic HIGH on path 416 implies that the corresponding power stage is 'enabled' to contribute to the load current requirement, and is 'disabled' otherwise. Thus, if a logic HIGH is received on path 416-2, then SPSA-2 220-2 will be enabled. Phase-enable controller 415 may be implemented in a known way.

Phase distributor 420 (PD 420) receives signal PWM-CLK (417), phase-enable signals PH-EN-1 (416-1) through PH-EN-6 (416-6), and generates start-PWM signals 422-1 through 422-6 (also termed 'timing signals') which are respective input signals to each T-ON generator, 425). PD 420 asserts a corresponding signal 422 in response to each pulse (e.g., transition type of logic LOW to logic HIGH) of signal PWM-CLK (417). In an embodiment, PD 420 operates to generate start-PWM signals (422) in a round-robin fashion for enabled power stages (power stages for which corresponding PH-EN signal (416) is logic HIGH). Thus, for example, if power stages SPS-1 (220-1) though SPS-5 (220-5) are enabled in a certain duration, and SPS-6 (220-6) is disabled in that duration, PD 420 asserts signals 422-1 through 422-5 in a round-robin sequence in response to the corresponding pulses of PWM-CLK (417) while keeping signal 422-6 de-asserted.

Each T-ON generator 425 receives corresponding 'start-PWM signal' 422 and generates a respective PWM signal (211) timed according to assertion of the corresponding 'start-PWM signal' 422. In the illustrative embodiment, T-ON generator 425 generates PWM signals (211) having a pre-determined (constant) ON-duration (logic HIGH duration), but whose frequency may vary as noted above. The pre-determined (fixed) pulse-width of each PWM signal (211) is independent of the pulse-widths of PWM-CLK (417) and the corresponding start-PWM (422) signal. Only the start (e.g., the edge from logic-low to logic-high) of PWM signal (211) is triggered by assertion of the corresponding start-PWM signal (422). The pulse-width of each PWM signal (211) is as set by circuitry internal to T-ON generator 425. T-ON generator 425 may be implemented in a known manner.

Upon the receipt of the rising edge of each pulse of signal PWM-CLK (417), PD 420 asserts (to logic HIGH) a corresponding signal start-PWM on path 422. As noted above, PD 420 operates to assert start-PWM signals (422) in a round-robin sequence. Thus, under normal (i.e., error-free) operation, only one start-PWM signal (422) is asserted in response to each rising-edge of signal PWM-CLK (417). Also, under normal operation, in one cycle of signal PWM-CLK (417), only one start-PWM (422) signal is asserted and active. In other words, assertion or activation of more than one start-PWM (422) signal or the absence of assertion of at least one start-PWM (422) signal in any cycle of PWM-CLK (417) indicates an error, as will be described in greater detail below.

Signal PWM-CLK (417) may be derived/generated using analog components (such as components internal to error amplifier 405 and PWM generator 410). Analog components are generally susceptible to generating signals (internal signals or output signals) that may substantially deviate from their ideal values (at least for brief durations) due to intrinsic thermal noise or extraneous supply/ground/substrate noise, as is well known in the relevant arts. These deviations can propagate and appear as glitches in path/signal PWM-CLK (417). A glitch generally refers to an unintended transition of a signal to the wrong logic level. Typically, the duration of a glitch is short, or may be much smaller compared to a normal duration of the signal. Glitches on path 417 may lead to errors in generation of start-PWM signals 422, and thus PWM signals (211), as will be described in detail below. Specifically, the glitches in PWM-CLK (417) when fed to the clock inputs of flip-flops inside the phase distributor (PD 420) can cause unpredictable behavior at the outputs (start-PWM signals 422) of PD 420. For example, it can happen that some flip-flops in PD 420 are properly clocked by the glitch while others are not, as noted below.

The manner in which start-PWM signals (422) are generated from PWM-CLK (417), error-conditions and their corrections are described next.

6. Generation of Timing Signals

FIGS. 4B-4E are used to illustrate error conditions in timing signals (i.e., start-PWM signals 422) and their correction, in an embodiment of the present disclosure. FIGS. 4B-4E are timing diagrams (not to scale) illustrating PWM-CLK (417), and start-PWM signals 422 generated by PD 420. Example waveforms of PWM-CLK (417), and start-PWM signals 422-1, 422-2 and 422-3 in steady-state operation are shown in FIGS. 4B-4E. For the sake of simplicity, it is assumed in the example illustration of FIGS. 4B-4E that only SPSA-1 (220-1), SPSA-2 (220-2) and SPSA-3 (220-3) (FIG. 2) are enabled, while SPSA-4 (220-4) to SPSA-6 (220-6) are disabled. Further, it is noted here that the frequency of signal PWMA-CLK (417) is shown to be constant for case of illustration, although signal PWM-CLK (417) could have varying frequency (e.g., during load transients and step changes in supply Vin, etc.) as noted above.

Figure 4B:
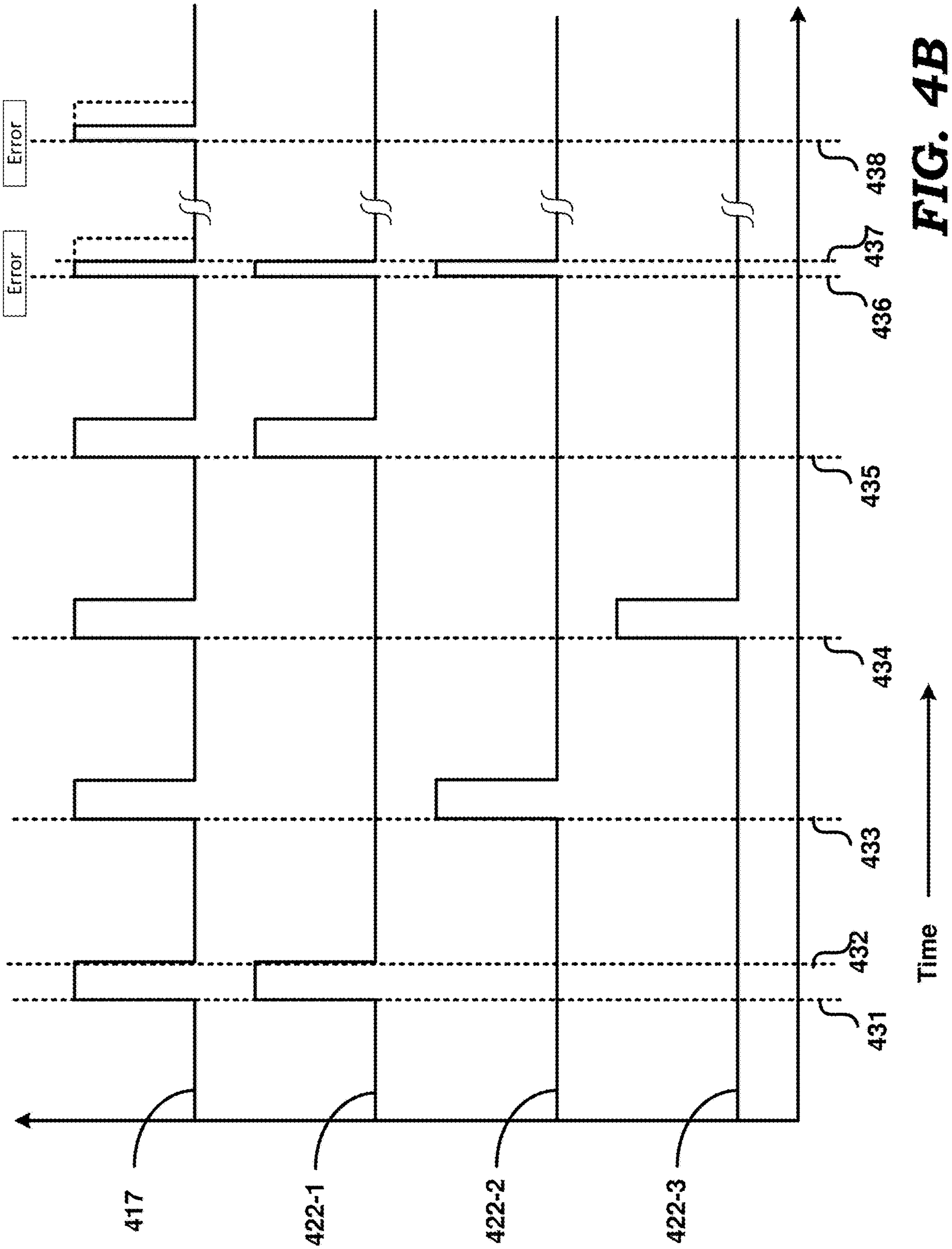
FIG. 4B is a timing diagram illustrating error conditions in generation of timing signals in a first scenario in an embodiment of the present disclosure.
Figure 4C:
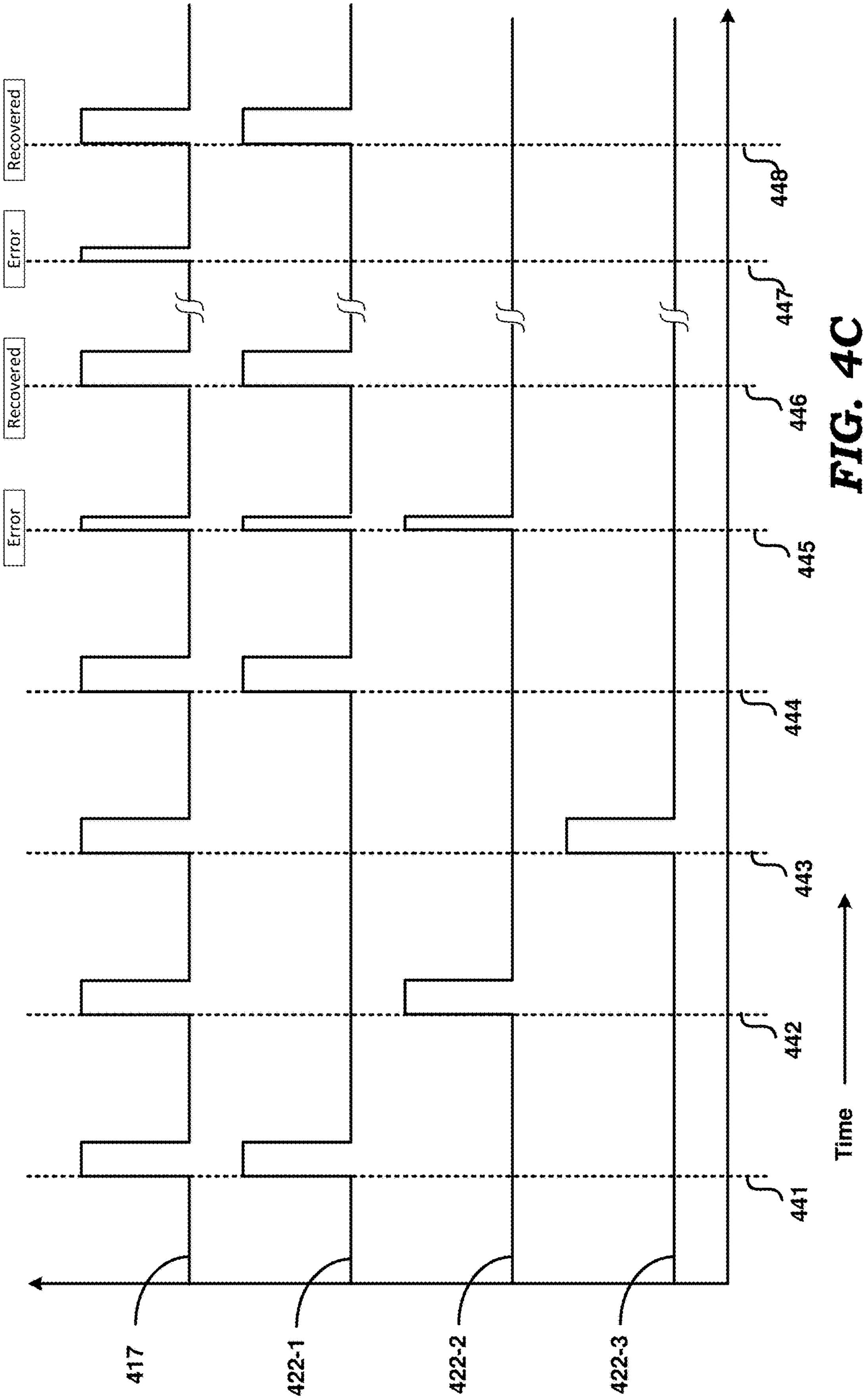
FIG. 4C is a timing diagram illustrating correction of error conditions in the first scenario in an embodiment of the present disclosure.

FIG. 4B is a timing diagram illustrating the occurrence of two types of error-conditions in the timing signals 422. FIG. 4C is a timing diagram illustrating the error-conditions of FIG. 4B and their corrections.

Referring to FIG. 4B, prior to time t436, it is assumed that phase controller 210 is operating normally (error-free), i.e., there is no error in the generation of start-PWM signals 422-1 through 422-3. Accordingly, prior to t435, one (and only one) of signals start-PWM-1 (422-1), start-PWM-2 (422-2) and start-PWM-3 (422-3) is asserted (to logic HIGH) and active in any one cycle of PWM-CLK (417), as is desired. Specifically, signal start-PWM-1 (422-1) is asserted in response to pulse of PWM-CLK (417) occurring at time instant t431. Signal start-PWM-2 (422-2) is asserted in response to pulse of PWM-CLK (417) occurring at time instant t433, and signal start-PWM-3 (422-3) is asserted in response to pulse of PWM-CLK (417) occurring at time instant t434. Time intervals t431-t433, t433-t434, t434-t435 depict three PWM cycles (i.e., cycles of signal PWM-CLK (417)). At time instant t435, signal start-PWM-1 (422-1) is shown as being asserted again in response to pulse of PWM-CLK (417).

Due to a glitch, PWM-CLK (417) at t436-t437 is narrower than it should normally be (shown in dotted lines). Such a glitch is shown causing more than one of signals 422 to become active in response to the narrow PWM-CLK. This can happen when the currently active flip-flop in the phase distributor is not successfully clocked by the narrow PWM-CLK but the next flip-flop in the phase distributor is successfully clocked by the narrow PWM-CLK. Thus, signals start-PWM-1 (422-1) and start-PWM-2 (422-2) are shown as being active in interval t436-t437, which represents an error-condition.

Another glitch on signal PWM-CLK (417) is shown as occurring at time instant t438. It is assumed that all earlier errors have been corrected by t438. Due to the glitch, none of start-PWM signals (422) gets asserted/activated at t438. This can happen when the current active flip-flop in the phase distributor is successfully clocked by the glitch but the next flipflop in the phase distributor is not successfully clocked.

Referring to FIG. 4C, interval t441-t445 corresponds to normal operation, and time intervals t441-t442, t442-t443, t443-t444 and t444-t445 depict four PWM cycles. The error-condition of activation of the two timing signals 422-1 and 422-2 at t445 is shown corrected at the beginning of the very next PWM cycle, which shows only one timing signal 422-1 activated at t446.

It is assumed that all earlier errors have been corrected by t447. The error-condition of activation of none of the timing signals at t447 is shown corrected at the beginning of the very next PWM cycle, which shows only one timing signal 422-1 activated at t448.

Although the error-conditions are shown corrected in the very next PWM cycle, such correction can in general be achieved in later PWM cycles also.

Figure 4D:
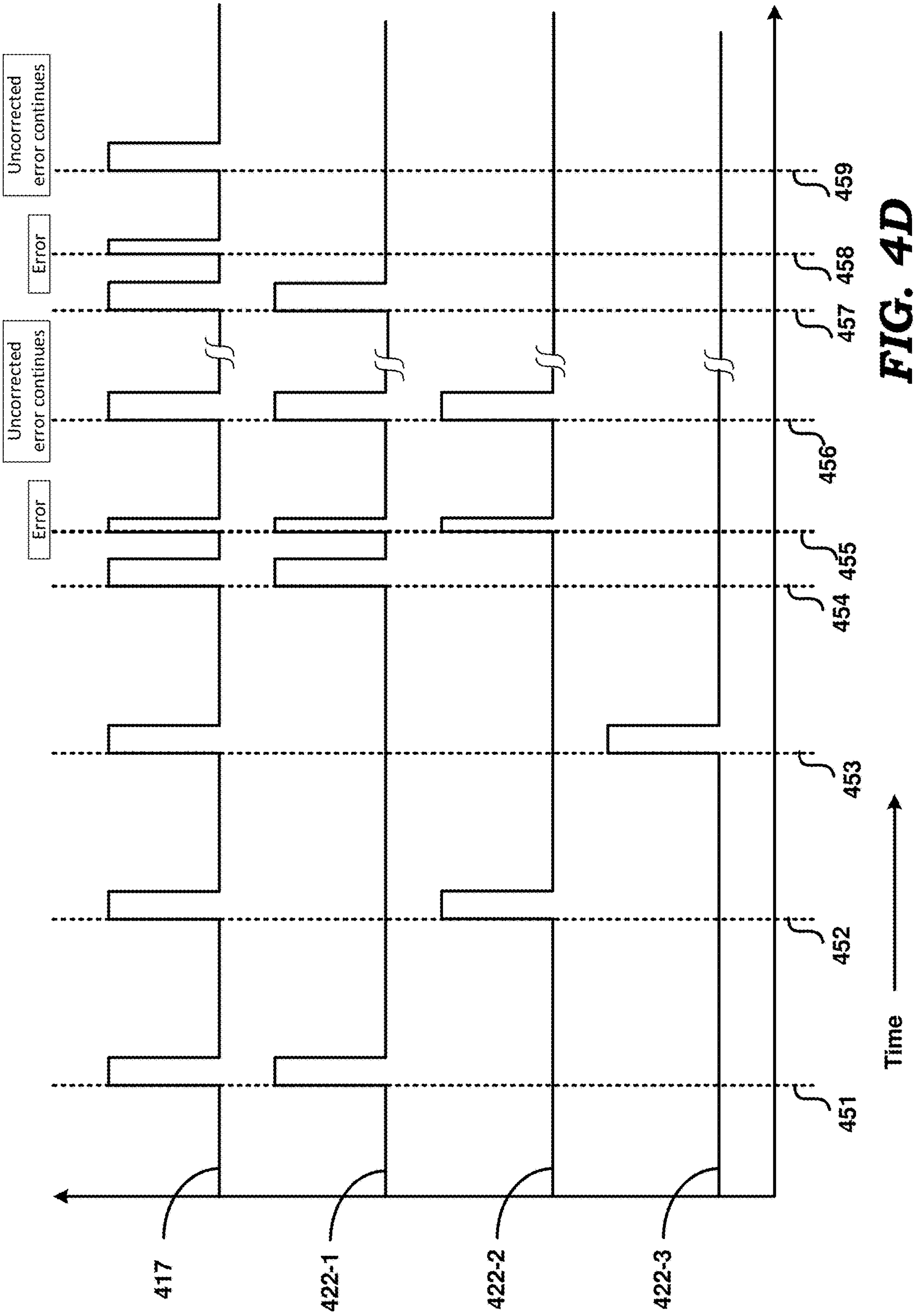
FIG. 4D is a timing diagram illustrating error conditions in generation of timing signals in a second scenario in an embodiment of the present disclosure.
Figure 4E:
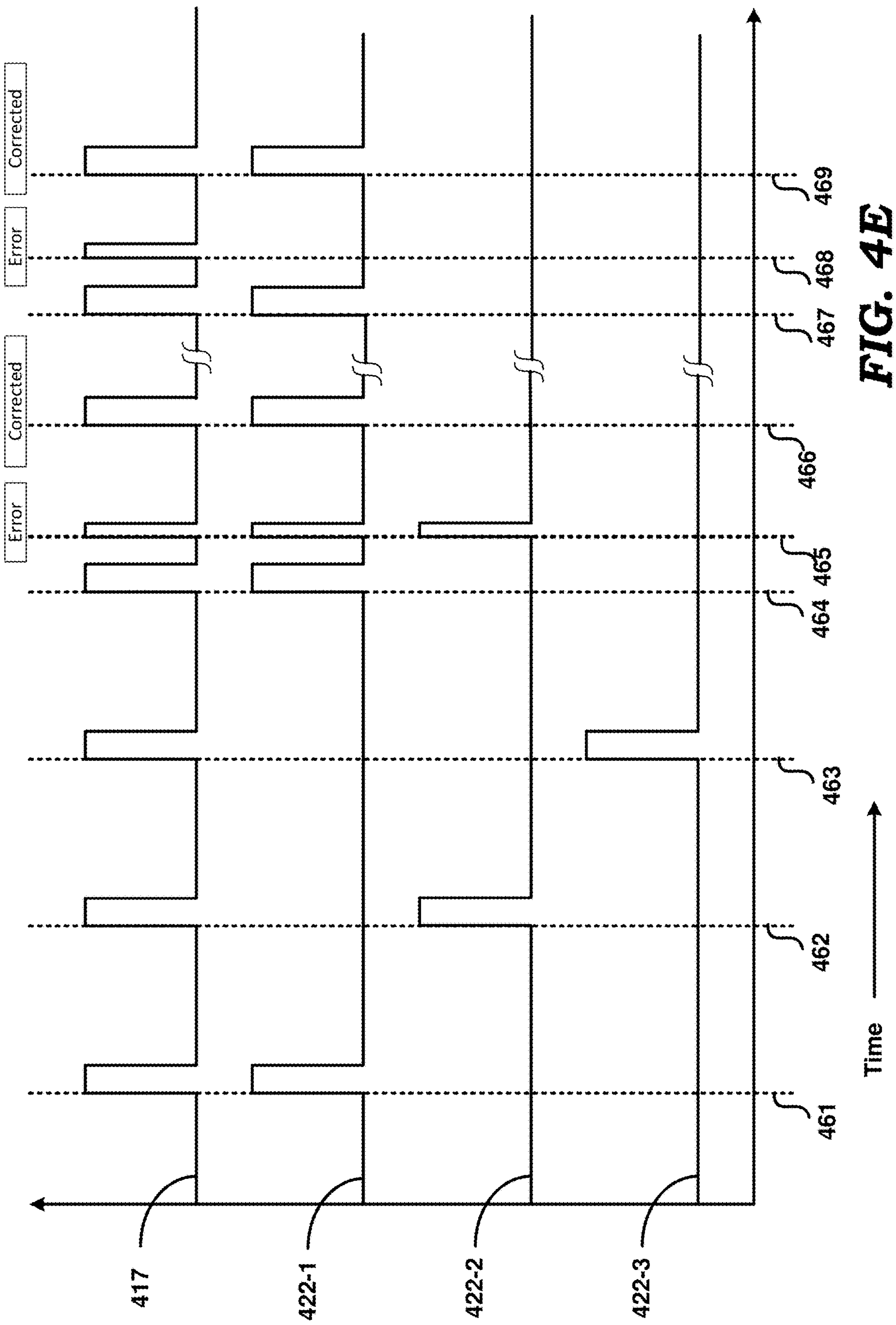
FIG. 4E is a timing diagram illustrating correction of error conditions in the second scenario in an embodiment of the present disclosure.

FIG. 4D is a timing diagram illustrating the occurrence of two types of error-conditions in the timing signals 422 in another scenario. FIG. 4E is a timing diagram illustrating the error-conditions of FIG. 4D and their corrections.

Referring to FIG. 4D, time duration t451-t454 corresponds to normal (without errors) steady-state operation of phase controller 210, with time intervals t451-t452, t452-t453, t453-t454 depicting three PWM cycles.

At t454, in response to a pulse (specifically, edge transition) of signal PWM-CLK (417), signal start-PWM-1 (422-1) is asserted. Due to a glitch occurring at time instant at t455, signals start-PWM-1 (422-1) and start-PWM-2 (422-2) are asserted. Time instant t456 depicts the time instant at which the next PWM-CLK occurs. Signals start-PWM-1 (422-1) and start-PWM-2 (422-2) are shown as being asserted in response to the PWM-CLK pulse at t456.

It is assumed that all earlier errors have been corrected by t457. At t457, in response to a pulse of signal PWM-CLK (417), signal start-PWM-1 (422-1) is asserted. A glitch on signal PWM-CLK (417) is shown as occurring at time instant t458. Due to the glitch, none of start-PWM signals (422) gets asserted at t459 when the next PWM-CLK pulse occurs, the normal pulse (following pulse at t457) occurs).

Referring to FIG. 4E, intervals t461-t462, t462-t463, t463-t464 depict three PWM cycles. The error-condition caused by the glitch at t465 is shown corrected at the beginning of the very next PWM cycle, which shows only one timing signal 422-1 activated at t466, unlike the activation of the two timing signals 422-1 and 422-2 at t456 in FIG. 4D.

It is assumed that all earlier errors have been corrected by t467. The error-condition caused by the glitch at t468 is shown corrected at the beginning of the very next PWM cycle, which shows one timing signal 422-1 activated at t469, unlike that at t459 in FIG. 4D at which point none of the timing signals is activated.

The description is continued with an example implementation of a phase distributor implemented inside phase controller 210 to handle such errors, in an embodiment of the present disclosure.

7. Phase Distributor

Figure 5:
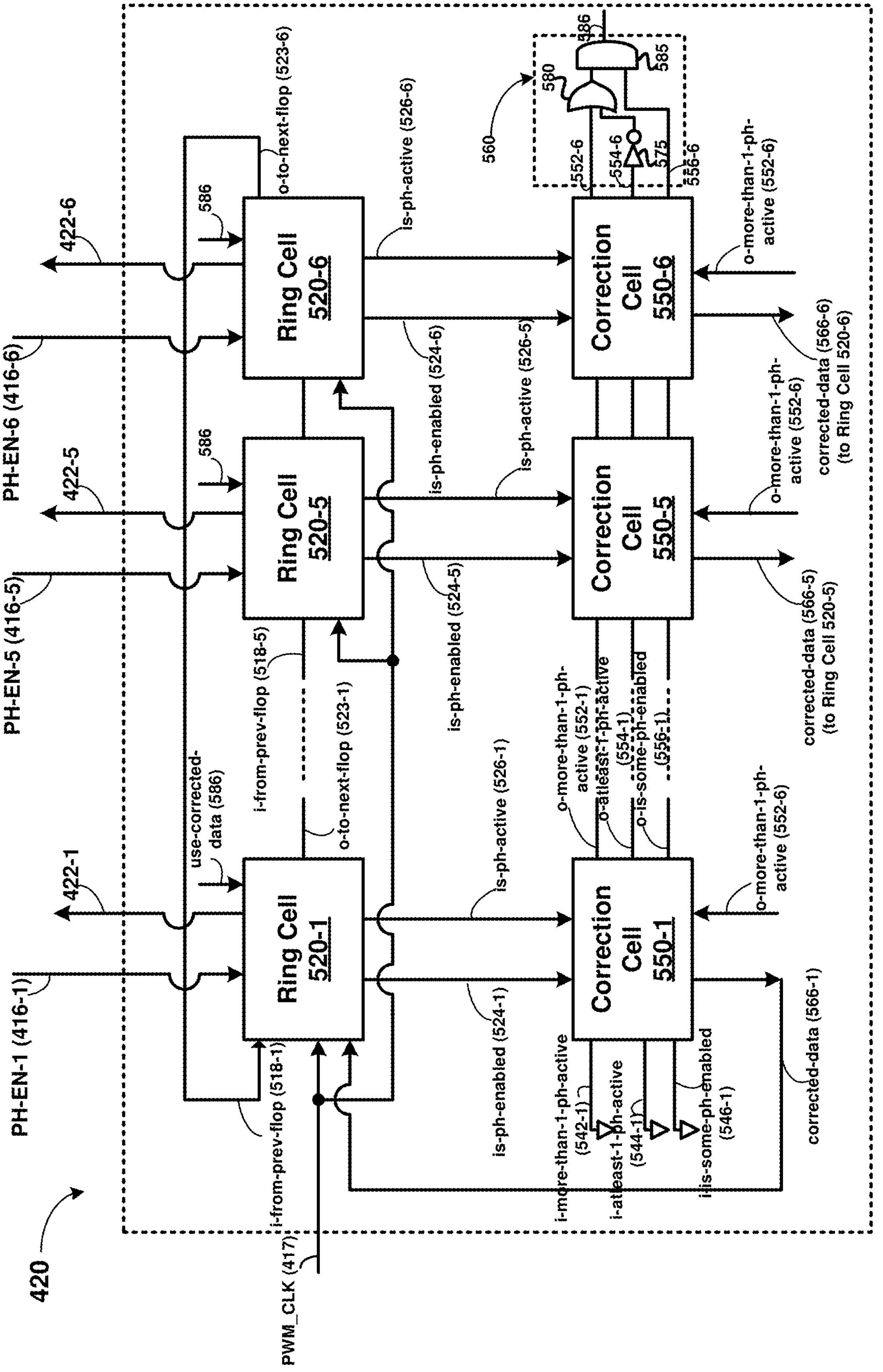
FIG. 5 is a block diagram illustrating the implementation of a phase distributor in a phase controller, in an embodiment of the present disclosure.

FIG. 5 is a diagram illustrating the implementation details of a phase distributor in an embodiment of the present disclosure. Phase distributor 420 is shown containing ring cells 520-1 through 520-6, correction cells 550-1 through 550-6 and detector block 560. Detector block 560 in turn is shown containing inverter 575, OR gate 580 and AND gate 585. It is noted that the implementation of phase distributor 420 shown in FIG. 5 is merely to illustrate. It is to be understood that alternative implementations of phase distributor 420 can contain more or fewer blocks than those shown in FIG. 5 and employ different logic.

Each ring cell 520 corresponds to a respective power stage 220 (not shown in FIG. 5). Thus, six ring cells 520-1 through 520-6 are depicted in FIG. 5, with each ring cell corresponding to a respective SPSA 220, as shown in the example embodiment of 6-phase buck converter of FIG. 2. Ring cell 520 is shown as receiving phase-enable (PH-EN) signal on path 416, signal PWM-CLK on path 417, signal use-corrected-data on path 586, input signal i-from-prev-flop on path 518 and MUX output on path 566 (corrected-data), and is shown generating signals is-ph-enabled on path 524, is-ph-active on path 526, o-to-next-flop on path 523 and start-PWM signal on path 422.

Ring cell 520 contains circuitry (described in detail below with respect to FIG. 6) to check if the corresponding power stage is enabled (based on signal received on path 416), and to activate the corresponding power stage based on input signal i-from-prev-flop received on path 518 and PWM-CLK received on path 417. In an embodiment, when a logic HIGH is received on path 518, then ring cell 520 generates a logic HIGH on path 523 at a next rising edge of PWM-CLK (417), and a logic LOW otherwise. As may be observed from FIG. 5, ring cells 520-1 through 520-6 are connected in a circular fashion such that the input signal (518) of each ring cell 520 corresponds to the output signal 523 of the previous ring cell, with the first ring cell (520-1) receiving the output signal (o-to-next-flop, 523-6) of the last ring cell (520-6). It is noted herein that in the present disclosure, a ring cell located immediately to the right of a 'current' ring cell (i.e., the ring cell that is being currently referred to) is referred to as the 'next' ring cell, and a ring cell located immediately to the left of the current ring cell is referred to as the 'previous' ring cell. Thus, ring cell 520-2 is the previous ring cell of ring cell 520-3 while ring cell 520-4 is the next ring cell of ring cell 520-3. Ring cell 520-1 is the left-most ring cell while ring cell 520-6 is the right-most ring cell. Similar convention is followed for correction cells 550.

Each correction cell 550 corresponds to a respective ring cell 520. Correction cell 550 is shown as receiving the following signals:

- is-ph-enabled on path 524, and is-ph-active on path 526 from the corresponding ring cell; and
- i-more-than-1-ph-active on path 542, i-atleast-1-ph-active on path 544, i-is-some-ph-enabled on path 546 from the previous correction cell; and
- o-more-than-1-ph-active on path 552-6 from correction cell 550-6.

Correction cell 550 is shown as generating signals o-more-than-1-ph-enabled on path 552, o-atleast-1-ph-enabled on path 554, o-is-some-ph-enabled on path 556, and corrected-data on path 566. Correction cells are shown connected in a sequence such that input signals 542, 544 and 546 respectively correspond to output signals 552, 554 and 556 of the previous correction cell. Input signals 542-1, 544-1 and 546-1 of the first correction cell 550-1 are shown as being connected to ground (constant reference potential). Output of correction cell 550 on path 566 is shown as being provided to the respective ring cell 520. Thus, signal 566-1 of correction cell 550-1 is shown as being provided to ring cell 520-1.

The logic states of the following signals of correction cells 550 in an example embodiment are listed below for ease of understanding:

- is-ph-enabled: A logic HIGH indicates that the corresponding SPS is enabled, while a logic LOW indicates that the corresponding SPS is disabled;
- is-ph-active: A logic HIGH indicates that the Q-output of the flip-flop of the corresponding ring cell is active (logic HIGH);

o-more-than-1-ph-active: A logic HIGH indicates that Q-output of more than one flip-flop is active at a given time. Such a state of signals is referred to as a 'first error condition' hereinafter (as in time interval t454-t456 of FIG. 4D).

o-atleast-1-ph-active: A logic LOW indicates that none of Q-outputs of flip-flops is active at a given time. Such a state of signals is referred to as a 'second error condition' hereinafter (as at t459 of FIG. 4D).

o-is-some-ph-enabled: A logic HIGH indicates that at least one SPS is enabled.

Correction cell 550 generates a logic HIGH on path 552 (o-more-than-1-ph-active) if one of the following conditions is true:

1. If the previous correction cell indicates that Q-output of more than one flip-flop is active (as indicated by a logic HIGH on input signal i-more-than-1-ph-active on path 542);
2. If at least one previous Q-output is active (as indicated by a logic HIGH on path 544) and the Q-output of flip-flop in ring cell corresponding to the current correction cell is also active (as indicated by a logic HIGH on paths 524 and 526).

A correction cell 550 generates a logic HIGH on path 554 (o-atleast-1-ph-active) if one of the following conditions is true:

1. If the previous correction cell indicates that Q-output of at least one flip-flop is active (as indicated by a logic HIGH on input signal i-atleast-1-ph-active on path 544);
2. The Q-output of flip-flip in ring cell corresponding to the current correction cell is active.

A correction cell 550 generates a logic HIGH on path 556 (o-is-some-ph-enabled) if one of the following conditions is true:

1. If the previous correction cell indicates that at least one phase is enabled (as indicated by a logic HIGH on input signal i-is-some-ph-enabled on path 546);
2. The SPS corresponding to the current correction cell is enabled.

Detector block 560 is shown as receiving signals o-more-than-1-ph-active (552-6), o-atleast-1-ph-active (554-6), and o-is-some-ph-enabled (556-6), and generates signal use-corrected-data on path 586.

The description is continued to illustrate the implementation details of a ring cell in an embodiment of the present disclosure.

8. Ring Cell

Figure 6:
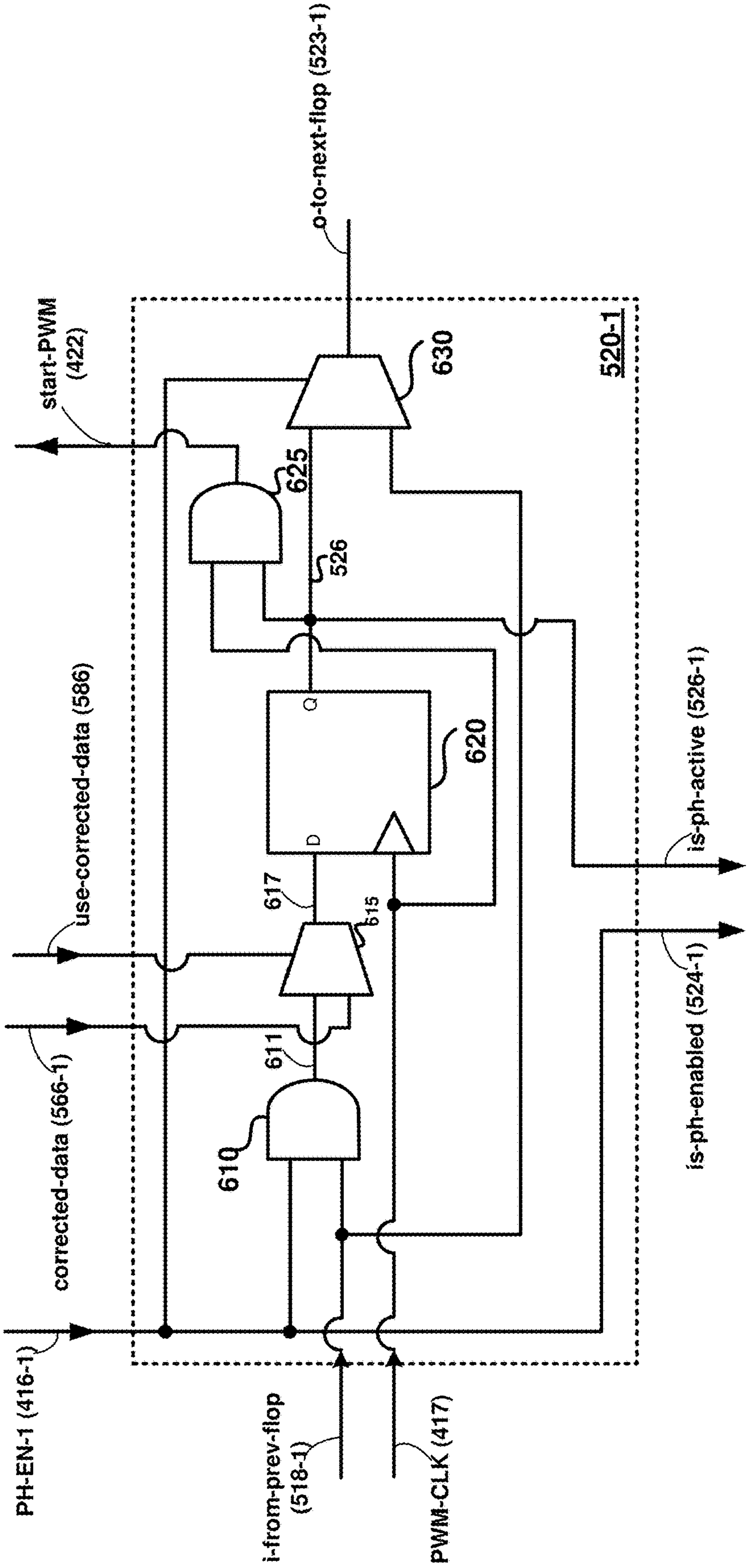
FIG. 6 is a diagram illustrating the implementation of a ring cell in a phase distributor, in an embodiment of the present disclosure.

FIG. 6 is a block diagram illustrating the implementation details of a ring cell in an embodiment of the present disclosure. Ring cell 520-1 is shown in detail in FIG. 6. The other ring cells can also be implemented to be similar to ring cell 520-1. However, in other embodiments, a ring cell can have more or fewer blocks. Ring cell 520-1 is shown as containing AND gates 610 and 625, MUXes 615 and 630, and D flip-flop 620.

AND gate 610 receives signal PH-EN-1 on path 416-1, signal i-from-prev-flop on path 518, and generates AND output on path 611. Accordingly, when both PH-EN-1 and i-from-prev-flop are logic HIGH, AND gate generates a logic HIGH.

MUX 615 receives AND gate output on path 611, corrected-data on path 566, and forwards one of signals 611 and 566-1 on path 617 as an output (MUX output 617) based on the logic value of select signal 586 (use-corrected-data). In an embodiment, when signal use-corrected-data (586) is a logic HIGH, signal 566-1 is selected as MUX output on path 617, while when signal use-corrected-data (586) is a logic LOW, AND gate output 611 is selected as MUX output on path 617.

Flip-flop 620 receives MUX output on path 617 at its D input, and generates output (Q) on path 526. Flip-flop 620 is clocked by signal PWM-CLK (417). In an embodiment, flip-flop 620 is implemented as a positive edge triggered flip-flop, with an active-low CLR input. Glitches in PWM-CLK (417) may result in flip-flop 620 exhibiting state changes in an unpredictable manner since the glitches may or may not clock the flip-flop. Thus, glitches in PWM-CLK (417) may result in the first error condition or the second error condition.

AND gate 625 receives signal PWM-CLK on path 417, Q-output (526), and generates AND output on path 422. AND gate output on path 422 (start-PWM) is provided to respective T-ON generator 425 as depicted in FIG. 4A. Thus, in the illustrative embodiment, pulse-width of signal start-PWM (422) is (substantially) equal to that of signal PWM-CLK (417). Although output of AND gate 625 is shown as being provided on path 422 in the illustrative embodiment, Q-output of flip-flop 620 may be provided on path 422 as input to T-ON generators 425 in alternative embodiments. In such alternative embodiments, signal 422, once asserted in response to a corresponding pulse of signal PWM-CLK (417), will remain asserted till the end of that cycle, as will be apparent to a skilled practitioner by reading the disclosure provided herein.

MUX 630 receives Q-output of flip-flop 620 on path 526 and signal i-from-prev-flop on path 518-1, and forwards one of signals 526 and 518-1 on path 523-1 as an output (MUX output/o-to-next-flop) based on the logic value of select signal 416-1 (PH-EN-1). In an embodiment, when signal PH-EN-1 (416-1) is a logic HIGH, Q-output 526 is selected as MUX output on path 523-1, while when signal PH-EN-1 (416-1) is a logic LOW, signal i-from-prev-flop (518-1) is selected as MUX output on path 523-1. In other words, when the SPS corresponding to ring cell 520 is not enabled, input signal (518) indicating active status of the previous ring cell is forwarded on path 523.

Outputs is-ph-enabled (524-1) and is-ph-active (526-1) respectively indicate if SPSA 220 corresponding to ring cell 520 is enabled and Q-output of corresponding flip-flop is active. In an embodiment, a logic HIGH on path 524-1 indicates that SPSA-1 220-1 is enabled, while a logic LOW on path 524-1 indicates that SPSA-1 220-1 is disabled. A logic HIGH on path 526-1 indicates that Q-output 526-1 is active (logic HIGH), while a logic LOW on path 526-1 indicates that Q-output 526-1 is logic LOW.

Thus, under normal operation (without any errors in generation of PWM signals), ring cells 520-1 through 520-6 operate to shift logic HIGH on Q-output of flip-flops (thereby turning ON/activating the different phases (SPSA-1 220-1 through SPSA-6 220-6)) in a round-robin sequence. At every low-to-high transition of signal PWM-CLK (417), the position of the active flip-flop (620) within ring cells 520 of phase distributor 420 advances by one location to the right or rolls back to the leftmost flip-flop. Thus, under normal operation, there is one (and only one) active flip-flop (Q-output is a logic HIGH) at any instant of time which corresponds to the active phase (SPS) at that instant of time.

The description is continued to illustrate the implementation details of a correction cell in an embodiment of the present disclosure.

9. Correction Cell

Figure 7:
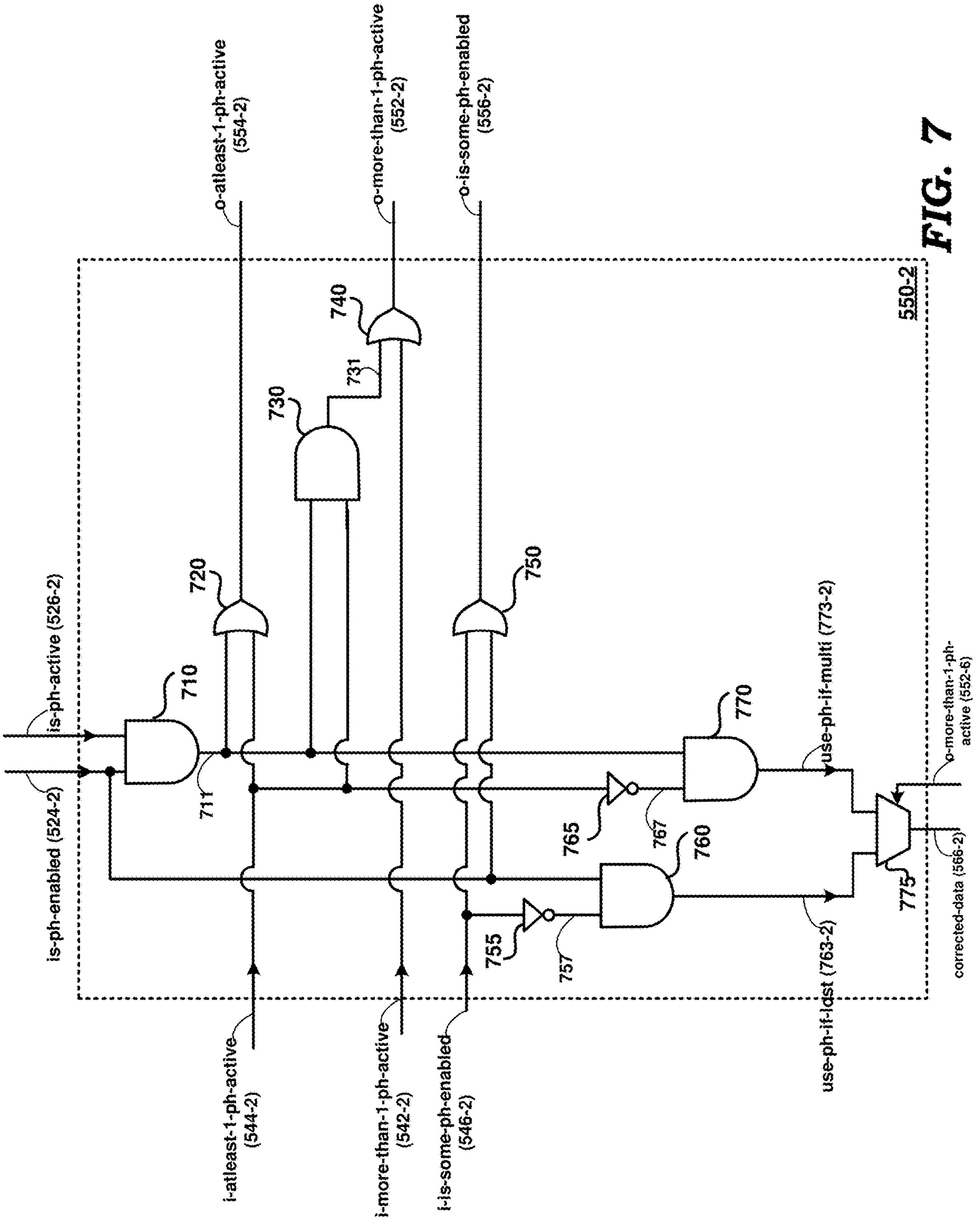
FIG. 7 is a diagram illustrating the implementation of a correction cell in a phase distributor, in an embodiment of the present disclosure.

FIG. 7 is a block diagram illustrating the details of a correction cell in an embodiment of the present disclosure. Correction cell 550-2 is shown in detail in FIG. 7. The other correction cells can also be implemented to be similar to ring cell 550-2, except that input signals 542-1, 544-1 and 546-1 of correction cell 550-1 will be connected to ground (as also depicted in FIG. 5). However, in other embodiments, a correction cell can have more or fewer blocks. Correction cell 550-2 is shown as containing AND gates 710, 730, 760 and 770, OR gates 720, 740 and 750, inverters 755 and 765, and MUX 775.

AND gate 710 receives signal is-ph-enabled on path 524-2 and signal is-ph-active on path 526-2, and generates AND output on path 711. OR gate 720 receives AND gate output on path 711 and signal i-atleast-1-ph-active on path 544-2, and generates OR output on path 554-1. Thus, OR gates 720 of correction cells 550 together operate to determine if Q-output of at least one flip-flop is active. A logic LOW on output signal o-atleast-1-ph-active of the last correction cell (550-6) accordingly indicates that none of the Q-outputs of flip-flops are active at a given time.

AND gate 730 receives output of AND gate 710 on path 711 and signal i-atleast-1-ph-active on path 544-2, and generates AND output on path 731. OR gate receives AND gate output on path 731 and signal i-more-than-1-ph-active on path 542-2, and generates OR output on path 552-2. Thus, AND gates 730 and OR gates 740 of correction cells 550 together operate to determine if Q-output of more than one flip-flop is active at a given time. A logic HIGH on any one of output signals o-more-than-1-ph-active 552-1 through 552-6 accordingly indicates that Q-output of more than one flip-flop is active at a given time.

OR gate 750 receives signal i-is-some-ph-enabled on path 546-2 and signal is-ph-enabled on path 524-2, and generates OR output on path o-is-some-ph-enabled on path 556-2. Thus, OR gates 720 of correction cells 550 together operate to determine if at least one SPS is enabled at a given time. A logic HIGH on any one of output signals o-is-some-ph-enabled 556-1 through 556-6 accordingly indicates that at least one SPS is enabled at a given time.

AND gate 760 receives inverted signal of input i-is-some-ph-enabled (546-2) on path 757 and signal is-ph-enabled on path 524-2, and generates AND output on path use-ph-if-lost on path 763-2. AND gate 770 receives inverted signal of input i-at-least-1-ph-active (544-2) on path 767 and output of AND gate 710 on path 711, and generates AND output on path use-ph-if-multi on path 773-2.

MUX 775 is shown as receiving signal use-ph-if-multi on path 773-2, signal use-ph-if-lost on path 763-2, and forwards one of signals 773 and 763 as the output on path 566-2 based on the logic value of select signal o-more-than-1-ph-active received on path 552-6. o-more-than-1-ph-active (552-6) corresponds to the output of the last correction cell (550-6). When o-more-than-1-ph-active (552-6) is a logic HIGH (indicating the first error condition), MUX 775 forwards the signal use-ph-if-multi (773) on path 566, and forwards the corresponding signal use-ph-if-lost (763) otherwise. Output of MUX 775 on path 566 is provided to the respective ring cell 520. Thus, signal 566-1 of MUX 775-1 is shown as being provided to ring cell 520-1.

Although the illustrative embodiment depicts a particular arrangement of logic gates for error detection and error correction in phase distributor 420, alternative embodiments may contain fewer or more blocks with suitable changes to arrangement, as will be apparent to a skilled practitioner by reading the disclosure provided herein. Also, transitions and logic states of signals may be suitably selected as per the design requirements of the specific environment, as will be apparent to a skilled practitioner by reading the disclosure provided herein.

Components 710, 720, 730, 740 and 750 of each correction cell 550 together enable detection of errors in the Q-outputs of the ring cells of PD 420, while components 755, 760, 765, 770 and 775 of correction cell 550 along with MUX 615 of the ring cells operate to correct the detected errors, as is described next.

10. Identifying Error States

Figure 8:
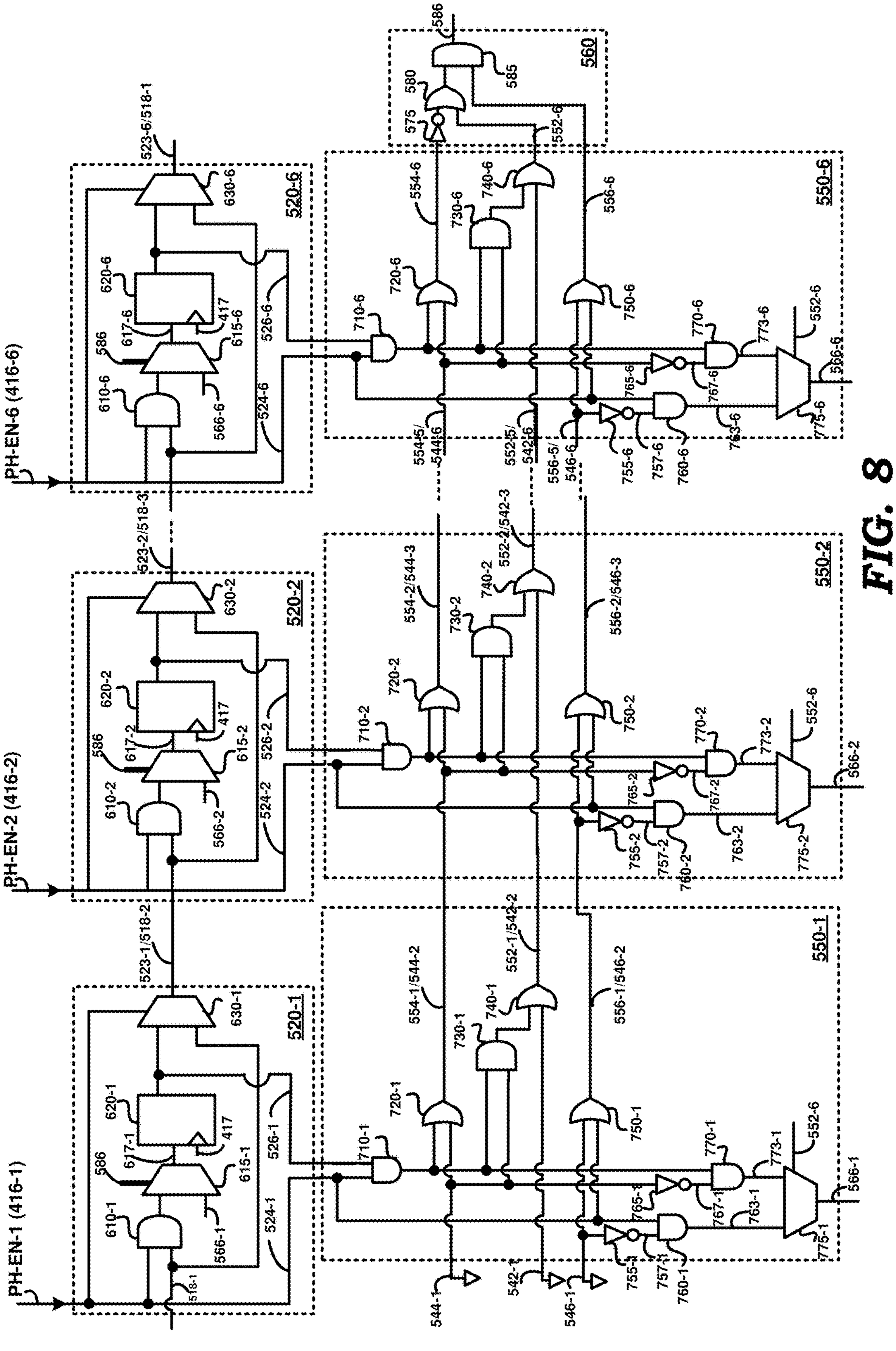
FIG. 8 is a diagram illustrating the implementation of a phase distributor in greater detail, in an embodiment of the present disclosure.

FIG. 8 is a diagram of the example phase distributor of FIG. 5, in which the internal details of the ring cells and correction cells there are additionally shown. Internal details of only ring cells 520-1, 520-2 and 520-6 and corresponding correction cells 550-1, 550-2 and 550-6 are depicted in FIG. 8 for case of understanding. In the description below, all the six power stages 220 are assumed to be enabled.

The logic states of the signals as relevant to the understanding of the disclosure are listed below for normal operation and error conditions. The logic states of the other signals will be apparent to a skilled practitioner by reading the disclosure herein.

Normal Operation (No Errors)

Under normal operation, Q-outputs 526-1 through 526-6 have a logic HIGH value in staggered sequence with flip-flops 620-1 through 620-6 being clocked by respective rising edges of signal PWM-CLK (417). Each of signals 554-1 through 554-6 (o-atleast-1-ph-active) is a logic HIGH. Each of signals 552-1 through 552-6 (o-more-than-1-ph-active) is a logic LOW. Each of signals 556-1 through 556-6 (o-is-some-ph-enabled) is a logic HIGH. Thus, inputs to OR gate 580 are both LOW, and accordingly output of AND gate 585 on path 586 (use-corrected-data) is a logic LOW. Therefore, each MUX 615-1 through 615-6 of ring cell 520 forwards the respective output of AND gates 610-1 through 610-6. MUXes 630-1 through 630-6 receive logic HIGH on respective paths 416-1 through 416-6. Thus, MUXes 630-1 through 630-6 forward respective Q-output of flip-flops 620. MUXes 775-1 to 775-6 receive logic LOW on path 552-6, and forward respective signals 773-1 to 773-6 on paths 566-1 to 566-6.

Error Condition 1—More than One Timing Signal Asserted in Response to a Same Pulse of PWM-CLK:

It is assumed that the current active flip-flop is 620-1 when a glitch occurs on path PWM-CLK (417). The glitch is assumed to cause (only) flip-flop 620-2 to be successfully clocked, thereby resulting in a logic HIGH value of Q-output 526-2. This would occur because Q-output of flip-flop 620-1 is already a logic HIGH, PH-EN-2 is also a logic HIGH and MUX 615 has a logic value of select signal 586 that forwards the logic HIGH output of AND gate 610-2 to the D input of flip-flop 620-2. It must be noted that if such an error were not corrected, in response to a normal pulse of PWM-CLK (417) occurring after the glitch, SPSs SPSA-1 220-1 as well as SPSA-2 220-2 would be activated simultaneously (via corresponding start-PWM signals 422 and PWM signals 211). It must also be noted that if such an error were not corrected, the error condition would persist even if there were no further glitches, with each of the Q-outputs that were at logic HIGH being shifted to the respective next flip-flops in the ring.

Logic states of ring cells 520 and correction cells 550 due to the error condition are described below:

For Correction Cell 550-1:

Signal 554-1 (o-at-least-1-ph-active) is a logic HIGH (since output of AND gate 710-1 is a logic HIGH). Signal 552-1 (o-more-than-1-ph-active) is a logic LOW (since output of AND gate 730-1 is a logic LOW as well as signal 542-1 is a logic LOW). Signal 556-1 (o-is-some-ph-enabled) is a logic HIGH (since PH-EN-1, 416-1 is a logic HIGH).

For Correction Cell 550-2:

Signal 554-2 (o-at-least-1-ph-active) is a logic HIGH (signal 554-1 is a logic HIGH, output of AND gate 710-2 is a logic HIGH). Signal 552-2 (o-more-than-1-ph-active) is a logic HIGH (since output of AND gate 730-2 is a logic HIGH). In other words, the current flip-flop (620-2) is active (as indicated by a logic HIGH on output of AND gate 710-2) and a previous flip-flop (620-1) is also active (as indicated by signal i-at-least-1-ph-active on path 544-2). For correction cells 550-3, 550-4, 550-5 and 550-6:

Each of input signals 544 (i-atleast-1-ph-active), 542 (i-more-than-1-ph-active) and 546 (i-is-some-ph-enabled) is a logic HIGH, and accordingly each of output signals 554 (o-atleast-1-ph-active), 552 (o-more-than-1-ph-active) and 556 (o-is-some-ph-enabled) is a logic HIGH.

Since signals 552-6 (o-more-than-1-ph-active) and 556-6 (o-is-some-ph-enabled) are logic HIGH, output of OR gate 580 is a logic HIGH, and accordingly output of AND gate 585 is a logic HIGH (which signals that an error condition has occurred). Thus, the first error condition is detected.

Referring to MUX 775-1 inside first correction cell 550-1, select signal 552-6 (o-more-than-1-ph-active) is a logic HIGH. Thus, MUX 775-1 forwards output of AND gate 770-1 on path 566-1, which is logic HIGH. Select signal 586 of MUX 615-1 of ring cell 520-1 is a logic HIGH, and accordingly MUX 615-1 forwards signal 566-1 as D input to flip-flop 620-1. At the next normal rising edge (referred to as 'first correcting edge') of signal PWM-CLK (417) occurring after the glitch, flip-flop 620-1 outputs logic HIGH on path 526-1. It may be appreciated that Q-output 526-1 continues to be logic HIGH.

Referring to MUX 775-2 inside second correction cell 550-2, select signal 552-6 (o-more-than-1-ph-active) is a logic HIGH. Thus, MUX 775-2 forwards output of AND gate 770-2 on path 566-2. Since signal 544-2 (i-atleast-1-ph-active) is logic HIGH, the inverted input (on path 767-2) to AND gate 770-2 is a logic LOW, and accordingly output of AND gate 770-2 is a logic LOW. Select signal 586 of MUX 615-2 of ring cell 520-2 is a logic HIGH, and accordingly MUX 615-2 forwards signal 566-2 as D input to flip-flop 620-2. Thus, at the first correcting edge of PWM-CLK (417), MUX 615-2, Q-output 526-2 of flip-flop 620-2 transitions to logic LOW from previous logic value of HIGH. In other words, only one flip-flop (and accordingly only one start-PWM signal/PWM signal/power stage) is active in each period of PWM-CLK (417) starting from the occurrence of the first correcting edge.

When signal 526-2 becomes LOW, output of AND gate 710-2 (and therefore output of AND gate 730-2) becomes logic LOW, thereby signal o-more-than-1-ph-active (552-2) also becomes a logic LOW, thus clearing (high-to-low transition) error detection signal 552-6 (o-more-than-1-ph-active). Accordingly, signal on path 586 (use-corrected-data) transitions to logic LOW. Phase distributor 420 resumes normal operation starting from the occurrence of first correcting edge of PWM-CLK (417). Thus, at the next normal rising edge (following the first correcting edge) of PWM-CLK (417), SPSA-1 220-1 is turned off and SPSA-2 220-2 is turned on, since signal on path 526-1 (Q-output of flip-flop 620-1) transitions to logic LOW while signal on path 526-2 (Q-output of flip-flop 620-2) transitions to logic HIGH.

Thus, phase distributor 420 drives the first active flip-flop (620-1 in the illustrative embodiment, corresponding to power stage SPSA-1 220-1, which was the first power stage to be activated immediately before the occurrence of the error that resulted in activation of multiple power stages) in phase distributor 420 that was holding a logic HIGH to remain HIGH, and the rest of the flip-flop(s) (620-2 in the illustrative embodiment, corresponding to power stage SPSA-2 220-2) that were holding a logic HIGH to transition to logic LOW.

Although the illustrative embodiment, for the sake of simplicity, describes error handling when two flip-flops become active simultaneously, aspects of the present disclosure are applicable when more than two flip-flops become active simultaneously, as will be apparent to a skilled practitioner by reading the disclosure herein.

Thus, phase distributor 420 detects and corrects the first error condition in which more than one timing signal is asserted in a cycle of PWM clock. The description is continued to illustrate detection and correction of the second error condition.

Error Condition 2—None of Timing Signals Asserted in Response to a Same Pulse of PWM-CLK:

It is assumed that the current active flip-flop is 620-1 when a glitch occurs on path PWM-CLK (417). The glitch is assumed to cause (only) flip-flop 620-1 to be successfully clocked. In other words, the current active flip-flop (620-1) in phase distributor 420 is successfully clocked by the glitch but the next flip-flop (620-2) in the phase distributor is not successfully clocked. As a result of the glitch, Q-output on path 526-1 transitions from logic HIGH to logic LOW. All the other Q-outputs continue to remain at logic LOW since the other flip-flops are not clocked by the glitch. Thus, at a time instant corresponding to a normal rising edge of PWM-CLK (417), none of start-PWM signals (422) is asserted (as illustrated at time instant t438 of FIG. 4B). It must be noted that if such error were not corrected, the error condition would persist even if there were no further glitches, with all of the Q-outputs continuing to be at logic LOW since the logic LOW output of each ring cell merely gets shifted to the next ring cell, and none of the power stages would ever be active again.

Logic states of ring cells 520 and correction cells 550 for the second error condition are described below:

For Correction Cell 550-1:

Signal 554-1 (o-at-least-1-ph-active) is a logic LOW (since output of AND gate 710-1 is a logic LOW due to logic LOW value of signal 526-1, as well as signal 544-1 is a logic LOW). Signal 552-1 (o-more-than-1-ph-active) is a logic LOW (since output of AND gate 730-1 is a logic LOW as well as signal 542-1 is a logic LOW). Signal 556-1 (o-is-some-ph-enabled) is a logic HIGH (since PH-EN-1, 416-1 is a logic HIGH).

For Correction Cell 550-2:

Signal 554-2 (o-at-least-1-ph-active) is a logic LOW (signal 554-1 is a logic LOW, output of AND gate 710-2 is a logic LOW, as the Q-output on path 526-2 continues to be logic LOW from the previous (previous to the glitch) rising edge of PWM-CLK, 417). Signal 552-2 (o-more-than-1-ph-active) is a logic LOW (since output of AND gate 730-2 is a logic LOW and signal 542-2 is a logic LOW). In other words, the current flip-flop (620-2) which should have been active if there had been no glitches in PWM-CLK (417), has not become active (as indicated by a logic LOW on Q-output 526-2 of flip-flop 620-2), and a previous flip-flop (620-1) has also become inactive (as indicated by input signal i-at-least-1-ph-active on path 544-2).

For Correction Cells 550-3, 550-4, 550-5 and 550-6:

Each of input signals 544 (i-atleast-1-ph-active) and 542 (i-more-than-1-ph-active) is a logic LOW, while signal 546 (i-is-some-ph-enabled) is a logic HIGH and, and accordingly each of output signals 554 (o-atleast-1-ph-active) and 552 (o-more-than-1-ph-active) is a logic LOW, while signal 556 (o-is-some-ph-enabled) is a logic HIGH.

Since signal 554-6 (o-atleast-1-ph-active) is a logic LOW, output of OR gate 580 is a logic HIGH, and accordingly output of AND gate 585 is a logic HIGH (since signal 556-6, o-is-some-ph-enabled, is a logic HIGH). Thus, the second error condition is detected.

Referring to MUX 775-1 inside first correction cell 550-1, select signal 552-6 (o-more-than-1-ph-active) is a logic LOW. Thus, MUX 566-1 forwards output of AND gate 760-1 on path 566-1, which is logic HIGH. Select signal 586 of MUX 615-1 of ring cell 520-1 is a logic HIGH, and accordingly MUX 615-1 forwards signal 566-1 as D input to flip-flop 620-1. At the next normal rising edge (referred to as 'second correcting edge') of signal PWM-CLK (417) occurring after the glitch, flip-flop 620-1 outputs logic HIGH on path 526-1. It may be appreciated that Q-output 526-1 transitions from logic LOW to logic HIGH.

Referring to MUX 775-2 inside second correction cell 550-2, select signal 552-6 (o-more-than-1-ph-active) is a logic LOW. Thus, MUX 566-2 forwards output of AND gate 760-2 on path 566-2. Since signal 546-2 (i-is-some-ph-enabled) is logic HIGH, the inverted input (on path 757-2) to AND gate 760-2 is a logic LOW, and accordingly output of AND gate 760-2 is a logic LOW. Select signal 586 of MUX 615-2 of ring cell 520-2 is a logic HIGH, and accordingly MUX 615-2 forwards signal 566-2 as D input to flip-flop 620-2. Thus, at the second correcting edge of PWM-CLK (417), MUX 615-2, Q-output of flip-flop 526-2 remains at logic LOW. In other words, at the second correcting edge, only flip-flop in the first ring cell (from left) that has corresponding input signal PH-EN 416 in logic HIGH state (620-1 in the illustrative example) is activated (thereby asserting only start-PWM-1 422-1), thus ensuring that Q-output of only one flip-flop is logic HIGH (and accordingly only one power stage, SPSA-1 220-1, is active), thus bringing PD 420 out of the error condition.

Thus, in an alternative scenario, assuming only SPSA-2 (220-2) and SPSA-3 (220-3) are enabled and other SPSs are disabled (i.e., SPSA-1 (220-1) and SPSA-4 (220-4) to SPSA-6 (220-6), had the glitch occurred when flip-flop (620-3) was active, the corrective action would have set the Q-output of flip-flop (620-2) of ring cell 520-2 to logic HIGH, and not the Q-output of flip-flop (620-1) of ring cell 520-1.

When signal 526-1 becomes HIGH, signal o-atleast-1-ph-active (554-1) also becomes a logic HIGH, thus clearing (low-to-high transition) error detection signal o-at-least-1-ph-active (554-6). Accordingly, signal on path 586 (use-corrected-data) transitions to logic LOW. Phase distributor 420 resumes normal operation starting from the second correcting edge of PWM-CLK (417). Thus, at the next normal rising edge (following the second correcting edge) of PWM-CLK (417), SPSA-1 220-1 is turned off and SPSA-2 220-2 is turned on, since signal on path 526-1 (Q-output of flip-flop 620-1) transitions to logic LOW while signal on path 526-2 (Q-output of flip-flop 620-2) transitions to logic HIGH.

Thus, the first error condition leads to more than one flip-flop becoming active (Q-output is logic HIGH) in response to a glitch. This can happen when the currently active flip-flop in the phase distributor is not successfully clocked by the glitch but the next flip-flop in the phase distributor is. Correction of the first error condition entails keeping the first flip-flop that was active before the occurrence of the error to remain active, while de-activating all other flip-flops in the PWM-CLK cycle following the error detection. However, when the right-most flip-flop in the ring (here, 620-6) is the first flip-flop that was active before the occurrence of the error (and the error leads to the left-most flip-flop (620-1) in the ring to also become active), correction entails keeping flip-flop 620-1 active while de-activating all other flip-flops (including 620-6).

In the second error condition, all flip-flops in phase distributor 420 get de-activated (Q-outputs become LOW) in response to a glitch. This can happen when the current active flip-flop in phase distributor 420 is successfully clocked by the glitch but the next flip-flop in phase distributor 420 is not. Correction of the second error condition entails activating the left-most enabled power stage while keeping all other power stages inactive.

Although the illustrative embodiment depicts a particular manner of selection of power stage to be activated as part of correction, any enabled power stage may be activated as part of correction with suitable changes to ring cell and/or correction cell circuit(s), as will be apparent to a skilled practitioner by reading the disclosure herein.

It may be appreciated that the PD 420 may be scaled to detect and correct errors for any number of power stages by simply adding more ring cells and correction cells such that there is one pair of ring cell and correction cell for each power stage in the multi-phase switching converter.

Although the illustrative embodiment depicts correction of errors in a single cycle (i.e., upon occurrence of the next normal rising edge of signal PWM-CLK (417) following the glitch, it may be appreciated that the correction can instead be caused to occur after two or more cycles of PWM-CLK (417) by appropriate modification of the circuits in the PD.

Although the example embodiment illustrated in FIG. 4A depicts constant ON-time current-mode control of multi-phase switching converter 110, aspects of the present disclosure can be equally well applied when other types of control are employed.

11. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, and 4A-4E, 5-8, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

In the instant application, the power and ground terminals are referred to as constant reference potentials.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A multi-phase switching converter to provide a regulated supply voltage from an input voltage, said multi-phase switching converter comprising:

a plurality of power stages, each power stage to receive a respective phase control signal and to connect said input voltage to a corresponding inductor when said respective phase control signal is in a first state and to disconnect said input voltage from said corresponding inductor when said respective phase control signal is in a second state;

a phase controller to generate said phase control signals, said phase controller comprising:

a plurality of signal generators, with each signal generator generating a corresponding phase control signal which changes to said first state timed according to an assertion of a respective timing signal;

a phase distributor to receive a common control signal having a transition type to indicate time instances at which said respective timing signals are to be asserted and to generate said timing signals, wherein said phase distributor detects a first error condition at a first time instance, said first error condition comprising assertion of more than one of said timing signals in a same cycle of said common control signal, wherein said phase distributor performs a first corrective action to avoid said first error condition in a first future duration following said first time instance.

2. The multi-phase switching converter of claim 1, wherein said phase distributor detects a second error condition at a second time instance, said second error condition comprising none of said timing signals being asserted in response to an instance of said transition type on said common control signal, wherein said phase distributor performs a second corrective action to avoid said second error condition in a second future duration following said second time instance.

3. The multi-phase switching converter of claim 2, wherein said phase distributor comprises:

a plurality of ring cells, wherein each ring cell corresponds to a respective power stage of said plurality of power stages, wherein each ring cell of said plurality of ring cells is coupled to receive an input-flop signal, a phase-enabled signal and to generate an output-flop signal, wherein said plurality of ring cells are connected in a circular fashion such that the input-flop signal of each ring cell corresponds to the output-flop signal of the previous ring cell, wherein each ring cell comprises a flip-flop clocked by said common control signal, wherein during normal operation the Q-output of a flip-flop of only one ring cell is asserted in a cycle of said common control signal;

a plurality of correction cells, wherein each correction cell in said plurality of correction cells corresponds to a respective ring cell in said plurality of ring cells; and a detector block to detect said first error condition and said second error condition, wherein said detector block detects said first error condition as being when the Q-output of more than one flip-flop is in a first logic state in said same cycle, wherein said first corrective action comprises retaining Q-output of the first flip-flop that was holding said first logic state immediately before the occurrence of said first error condition in said first logic state in said first future duration, and setting the Q-outputs of other flip-flops holding said first logic state to a second logic state in said first future duration, wherein said detector block detects said second error condition as being when the Q-output of none of said plurality of flip-flops is in said first logic state in response to said instance of said transition type, wherein said second corrective action comprises setting the Q-output of the flip-flop of only one ring cell to said first logic state in said second future duration, wherein said only one ring cell has said phase-enabled signal also in said first logic state.

4. The multi-phase switching converter of claim 3, wherein a duration of said corresponding phase control signal in said first state is fixed, wherein said first future duration commences upon the occurrence of an instance of said transition type of said common control signal occurring after said first time instance, wherein said second future duration commences upon the occurrence of an instance of said transition type of said common control signal occurring after said second time instance, wherein said first logic state is a logic HIGH and said second logic state is a logic LOW, wherein said transition type is transition from logic LOW to logic HIGH.

5. The multi-phase switching converter of claim 4, wherein each correction cell is coupled to receive a phase-activated signal from the corresponding ring cell, said phase-enabled signal, a first error-detect input signal, a second error-detect input signal and a third error-detect input signal, and to generate a first error-detect output signal, a second error-detect output signal, a third error-detect output signal, a first error-correct signal and a second error-correct signal, wherein said plurality of correction cells are connected in a sequential fashion, such that said first error-detect input signal, said second error-detect input signal and said third error-detect input signal of a correction cell respectively correspond to said first error-detect output signal, said second error-detect output signal and said third error-detect output signal of the previous correction cell in said sequence of plurality of correction cells, wherein each of said first error-detect signal, said second error-detect signal and said third error-detect signal of the first correction cell in said sequence of plurality of correction cells is coupled to a constant reference potential.

6. The multi-phase switching converter of claim 5, wherein said phase distributor further comprises:

a plurality of corrected-data-selection multiplexers (MUXes), wherein each corrected-data-selection MUX corresponds to a respective correction cell of said plurality of correction cells, wherein said detector block comprises:

a first inverter coupled to receive second error-detect output signal of the last correction cell in said sequence of correction cells;

a first OR gate coupled to receive output of said first inverter, said first error-detect output signal of the last correction cell in said sequence of correction cells, and to generate a first-OR-output signal; and a first AND gate coupled to receive said first-OR-output signal and said third error-detect output signal of the last correction cell in said sequence of correction cells, and to generate a correction-selection signal, wherein each corrected-data-selection MUX of said plurality of corrected-data-selection MUXes is coupled to receive respective first error-correct signal and second error-correct signal of the corresponding correction cell as inputs, and first error-detect output signal of the last correction cell in said sequence of correction cells as a select signal, said corrected-data-selection MUX to forward said first error-correct signal as corrected-data signal if said first error-detect output signal of the last correction cell is a logic HIGH, said corrected-data-selection MUX to forward said second error-correct signal as corrected-data signal if said first error-detect output signal of the last correction cell is a logic LOW, wherein said control block additionally receives respective inductor currents generated by each of said plurality of power stages, and said common control signal is also based on said respective inductor currents.

7. The multi-phase switching converter of claim 6, wherein each ring cell of said plurality of ring cells comprises:

a second AND gate coupled to receive corresponding phase-enabled signal and said input-flop signal, and to generate a second-AND-output signal;

a first MUX coupled to receive said second-AND-output signal and a respective said corrected-data signal of corresponding said corrected-data-selection MUX as inputs and said correction-selection signal as a select signal, said first MUX to forward said first error-correct signal as first-MUX-output if said correction-selection signal is a logic HIGH, said first MUX to forward said second-AND-output signal as first-MUX-output if said correction-selection signal is a logic LOW, wherein said flip-flop receives said first-MUX-output as its D input;

a second MUX coupled to receive Q-output of respective flip-flop and said input-flop signal as inputs, said phase-enabled signal as a select signal, said second MUX to forward said Q-output as said output-flop signal if said phase-enabled signal is a logic HIGH, said second MUX to forward said input-flop signal as output-flop signal if said phase-enabled signal is a logic LOW; and a third AND gate coupled to receive a Q-output of a respective flip-flop and said common control signal as inputs, and to generate said timing signal.

8. The multi-phase switching converter of claim 7, wherein each correction cell of said plurality of correction cells comprises:

a fourth AND gate coupled to receive said phase-enabled signal and said phase-activated signal, and to generate a fourth-AND-output;

a second OR gate coupled to receive said fourth-AND-output and said second error-detect input signal, and to generate said second error-detect output signal;

a fifth AND gate coupled to receive said fourth-AND-output and said second error-detect input signal, and to generate fifth-AND-output;

a third OR gate coupled to receive said fifth-AND-output and said first error-detect input signal, and to generate said first error-detect output signal;

a fourth OR gate coupled to receive said third error-detect input signal and said phase-enabled signal, and to generate said third error-detect output signal;

a second inverter coupled to receive said third error-detect input signal;

a sixth AND gate coupled to receive output of said second inverter and said phase-enabled signal, and to generate said second error-correct signal;

a third inverter coupled to receive said second error-detect input signal; and a seventh AND gate coupled to receive output of said third inverter and said fourth-AND-output, and to generate said first error-correct signal.

9. A method of handling errors in generation of phase control signals, said method performed in a phase controller of a multi-phase switching converter, said multi-phase switching converter to provide a regulated supply voltage from an input voltage, said phase controller to provide corresponding phase control signals to a plurality of power stages, each power stage operable to connect said input voltage to a corresponding inductor when a corresponding phase control signal of a plurality of control signals changes to a first state such that said plurality of power stages together operate to provide said regulated supply voltage, said method comprising:

generating a common control signal having a transition type to indicate time instances of assertions of a plurality of timing signals;

generating a respective timing signal in said plurality of timing signals for each power stage of said plurality of power stages, wherein said corresponding phase control signal changes to said first state timed according to an assertion of said respective timing signal;

detecting a first error condition comprising assertion of more than one of said plurality of timing signals in response to an instance of said transition type of said common control signal; and performing a first corrective action to avoid said first error condition in a first future duration following said detection of said first error condition.

10. The method of claim 9, said method comprising:

detecting a second error condition comprising none of said timing signals being asserted in response to an instance of said transition type of said common control signal; and performing a second corrective action to avoid said second error condition in a second future duration following said detection of second error condition.

11. The method of claim 10, wherein a duration of said corresponding phase control signal in said first state is fixed, w herein said phase controller comprises:

a plurality of signal generators, with each signal generator receiving a respective timing signal of said plurality of timing signals and generating a corresponding phase control signal of said plurality of phase control signals; and a phase distributor receiving said common control signal and generating said plurality of timing signals.

12. The method of claim 11, wherein said phase distributor comprises:

a plurality of ring cells, wherein each ring cell corresponds to a respective power stage of said plurality of power stages, wherein each ring cell of said plurality of ring cells is coupled to receive an input-flop signal, a phase-enabled signal and to generate an output-flop signal, wherein said plurality of ring cells are connected in a circular fashion such that the input-flop signal of each ring cell corresponds to the output-flop signal of the previous ring cell, wherein each ring cell comprises a flip-flop clocked by said common control signal, wherein during normal operation the Q-output of a flip-flop of only one ring cell is asserted in a cycle of said common control signal;

a plurality of correction cells, wherein each correction cell in said plurality of correction cells corresponds to a respective ring cell in said plurality of ring cells; and a detector block to detect said first error condition and said second error condition, wherein said detector block detects said first error condition as being when the Q-output of more than one flip-flop is in a first logic state at said first time instance, wherein said first corrective action comprises setting Q-output of the first flip-flop that was holding said first logic state immediately before the occurrence of said first error condition to said first logic state in said first future duration, and setting Q-output of other flip-flops holding said first logic state to a second logic state in said first future duration, wherein said detector block detects said second error condition as being when Q-output of none of said plurality of flip-flops being in said first logic state at said second time instance, wherein said second corrective action comprises setting Q-output of the flip-flop comprised in the first ring cell in said circular sequence that has said phase-enabled signal in said first logic state to said first logic state in said second future duration.

13. The method of claim 12, wherein said first future duration commences upon the occurrence of an instance of said transition type of said common control signal occurring after said first time instance, wherein said second future duration commences upon the occurrence of an instance of said transition type of said common control signal occurring after said second time instance, wherein said first logic state is a logic HIGH and said second logic state is a logic LOW, wherein said transition type is transition from logic LOW to logic HIGH.

14. The method of claim 13, wherein each correction cell is coupled to receive a phase-activated signal from the corresponding ring cell, said phase-enabled signal, a first error-detect input signal, a second error-detect input signal and a third error-detect input signal, and to generate a first error-detect output signal, a second error-detect output signal, a third error-detect output signal, a first error-correct signal and a second error-correct signal, wherein said plurality of correction cells are connected in a sequential fashion, such that said first error-detect input signal, said second error-detect input signal and said third error-detect input signal of a correction cell respectively correspond to said first error-detect output signal, said second error-detect output signal and said third error-detect output signal of the previous correction cell in said sequence of plurality of correction cells, wherein each of said first error-detect signal, said second error-detect signal and said third error-detect signal of the first correction cell in said sequence of plurality of correction cells is coupled to a constant reference potential.

15. The method of claim 14, wherein said phase distributor further comprises:

a plurality of corrected-data-selection multiplexers (MUXes), wherein each corrected-data-selection MUX corresponds to a respective correction cell of said plurality of correction cells, wherein said detector block comprises:

a first inverter coupled to receive second error-detect output signal of the last correction cell in said sequence of correction cells;

a first OR gate coupled to receive output of said first inverter, said first error-detect output signal of the last correction cell in said sequence of correction cells, and to generate a first-OR-output signal; and a first AND gate coupled to receive said first-OR-output signal and said third error-detect output signal of the last correction cell in said sequence of correction cells, and to generate a correction-selection signal, wherein each corrected-data-selection MUX of said plurality of corrected-data-selection MUXes is coupled to receive respective first error-correct signal and second error-correct signal of the corresponding correction cell as inputs, and first error-detect output signal of the last correction cell in said sequence of correction cells as a select signal, said corrected-data-selection MUX to forward said first error-correct signal as corrected-data signal if said first error-detect output signal of the last correction cell is a logic HIGH, said corrected-data-selection MUX to forward said second error-correct signal as corrected-data signal if said first error-detect output signal of the last correction cell is a logic LOW, wherein said control block additionally receives respective inductor currents generated by each of said plurality of power stages, and said common control signal is also based on said respective inductor currents.

16. A phase distributor of a phase controller of a multi-phase switching converter, said phase controller to provide corresponding phase control signals to a plurality of power stages of said multi-phase switching converter, each power stage designed to connect a power source to a corresponding inductor when a corresponding phase control signal is asserted such that said plurality of power stages together operate to provide a regulated supply voltage, said phase distributor comprising:

a plurality of ring cells connected in a circular sequence, wherein each ring cell corresponds to a respective power stage of said plurality of power stages and comprises a flip-flop clocked by a common control signal generated by a control block of said phase controller, wherein during normal operation the Q-outputs of the respective flip-flops are sequentially asserted in a round-robin fashion to thereby trigger a start of a corresponding phase control signal of said plurality of phase control signals, the Q-output of the flip-flop of only one ring cell being asserted in any one cycle of said common control signal during said normal operation;

a plurality of correction cells, wherein each correction cell in said plurality of correction cells corresponds to a respective ring cell in said plurality of rings cells and receives a first set of signals from said respective ring cell, each correction cell to provide a corresponding correction signal to said respective ring cell upon occurrence of one or more error conditions in said plurality of ring cells; and a detector block coupled to receive a second set of signals from said plurality of correction cells, said detector block to detect said one or more error conditions based on said second set of signals, and upon detection of an error condition to generate an output signal coupled to each of said plurality of ring cells, said output signal to cause each of said corresponding correction signals to perform a portion of a corrective action in said respective ring cell.

17. The phase distributor of claim 16, wherein said one or more error conditions comprises a first error condition, said first error condition being assertion of Q-outputs of more than one flip-flop in a same cycle of said common control signal, wherein said plurality of correction cells generate said correction signals to, in a future cycle following said same cycle, maintain asserted the Q-output of the flip-flop that was asserted immediately before the occurrence of said first error condition, and de-assert the Q-outputs of other flip-flops that are asserted.

18. The phase distributor of claim 17, wherein said future cycle is immediately next to said same cycle.

19. The phase distributor of claim 16, wherein said one or more error conditions comprises a second error condition, said second error condition being the Q-output of none of said plurality of flip-flops being asserted in a same cycle of said common control signal, wherein said plurality of correction cells generate said correction signals to cause the Q-output of the flip-flop of only one ring cell to be asserted in a future cycle following said same cycle.

20. The phase distributor of claim 19, wherein said future cycle is immediately next to said same cycle.

* * * * *